United States Patent
Chi et al.

(10) Patent No.: US 6,708,074 B1
(45) Date of Patent: Mar. 16, 2004

(54) GENERIC INTERFACE BUILDER

(75) Inventors: Yuehshian T. Chi, San Jose, CA (US); Parris C. M. Hawkins, Pleasanton, CA (US); Qiaolin Jin, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/637,620

(22) Filed: Aug. 11, 2000

(51) Int. Cl.[7] .......................... G06F 19/00; G01R 31/26
(52) U.S. Cl. .......................... 700/121; 700/96; 700/28
(58) Field of Search .......................... 700/19, 28, 121, 700/96, 95; 710/64

(56) References Cited

U.S. PATENT DOCUMENTS

| | | |
|---|---|---|
| 3,205,485 A | 9/1965 | Noltingk |
| 3,229,198 A | 1/1966 | Libby |
| 3,767,900 A | 10/1973 | Chao et al. |
| 3,920,965 A | 11/1975 | Sohrwardy |
| 4,000,458 A | 12/1976 | Miller et al. |
| 4,302,721 A | 11/1981 | Urbanek et al. |
| 4,368,510 A | 1/1983 | Anderson |
| 4,616,308 A | 10/1986 | Morshedi et al. |
| 4,663,703 A | 5/1987 | Axelby et al. |
| 4,698,766 A | 10/1987 | Entwistle et al. |
| 4,750,141 A | 6/1988 | Judell et al. |
| 4,757,259 A | 7/1988 | Charpentier |
| 4,796,194 A | 1/1989 | Atherton |
| 4,938,600 A | 7/1990 | Into |
| 4,967,381 A | 10/1990 | Lane et al. |
| 5,089,970 A | 2/1992 | Lee et al. |

(List continued on next page.)

FOREIGN PATENT DOCUMENTS

| | | |
|---|---|---|
| CA | 2050247 | 8/1991 |
| CA | 2165847 | 8/1991 |
| CA | 2194855 | 8/1991 |

(List continued on next page.)

OTHER PUBLICATIONS

Dishon, G., D. Eylon, M. Finarov, and A. Shulman. "Dielectric CMP Advanced Process Control Based on Integrated Monitoring." Ltd. Rehoveth, Israel: Nova Measuring Instruments.

Runyan, W. R., and K. E. Bean. 1990. "Semiconductor Integrated Circuit Processing Technology." p. 48. Reading, Massachusetts: Addison–Wesley Publishing Company.

Zorich, Robert. 1991. *Handbook of Quality Integrated Circuit Manufacturing*. pp. 464–498 San Diego, California: Academic Press, Inc.

(List continued on next page.)

*Primary Examiner*—Leo Picard
*Assistant Examiner*—Alexander Kosowski
(74) *Attorney, Agent, or Firm*—Hale and Dorr LLP

(57) ABSTRACT

Generic interface adapter builder software generates an interface adapter to tie tools into a centralized manufacturing execution system. As contemplated by embodiments of the present invention, the interface adapter allows a tool in a semiconductor manufacturing assembly to communicate with other hardware and software in the centralized manufacturing execution system in accordance with a standard protocol and be operable from a common view graphical user interface. The generic interface builder software uses a classification of the type library and desired parameters for a particular tool to generate the interface adapter that maps the interface methods of the tool to the interface of the manufacturing execution system and handles long running service request support. In one aspect of the invention, the tool to be integrated into the manufacturing assembly may be a material control system. As contemplated by embodiments of the present invention, the material control system uses COM-based interface methods, and may optionally include a COM-based protocol converter, and may expose its interface methods via a type library.

33 Claims, 10 Drawing Sheets

U.S. PATENT DOCUMENTS

| | | |
|---|---|---|
| 5,108,570 A | 4/1992 | Wang |
| 5,208,765 A | 5/1993 | Turnbull |
| 5,220,517 A | 6/1993 | Sierk et al. ............... 340/3.1 |
| 5,226,118 A | 7/1993 | Baker et al. |
| 5,231,585 A | 7/1993 | Kobayashi et al. |
| 5,236,868 A | 8/1993 | Nulman |
| 5,260,868 A | 11/1993 | Gupta et al. |
| 5,270,222 A | 12/1993 | Moslehi |
| 5,283,141 A | 2/1994 | Yoon et al. |
| 5,295,242 A * | 3/1994 | Mashruwala et al. ....... 345/835 |
| 5,309,221 A | 5/1994 | Fischer et al. |
| 5,329,463 A | 7/1994 | Sierk et al. ................ 340/606 |
| 5,338,630 A | 8/1994 | Yoon et al. |
| 5,347,446 A | 9/1994 | Iino et al. |
| 5,367,624 A | 11/1994 | Cooper |
| 5,375,064 A | 12/1994 | Bollinger |
| 5,398,336 A | 3/1995 | Tantry et al. |
| 5,402,367 A | 3/1995 | Sullivan et al. |
| 5,408,405 A | 4/1995 | Mozumder et al. |
| 5,410,473 A | 4/1995 | Kaneko et al. |
| 5,420,796 A | 5/1995 | Weling et al. |
| 5,469,361 A | 11/1995 | Moyne |
| 5,485,082 A | 1/1996 | Wisspeintner et al. |
| 5,490,097 A | 2/1996 | Swenson et al. |
| 5,495,417 A | 2/1996 | Fuduka et al. ............. 700/121 |
| 5,497,316 A | 3/1996 | Sierk et al. ................. 700/11 |
| 5,497,381 A | 3/1996 | O'Donogline et al. |
| 5,503,707 A | 4/1996 | Maung et al. ............... 427/10 |
| 5,508,947 A | 4/1996 | Sierk et al. ................ 702/104 |
| 5,511,005 A | 4/1996 | Abbe et al. |
| 5,519,605 A | 5/1996 | Cawlfield |
| 5,525,808 A | 6/1996 | Irie et al. |
| 5,526,293 A | 6/1996 | Mozumder et al. |
| 5,541,510 A | 7/1996 | Danielson |
| 5,546,312 A | 8/1996 | Mozumder et al. |
| 5,553,195 A | 9/1996 | Meijer |
| 5,586,039 A | 12/1996 | Hirsch et al. |
| 5,599,423 A | 2/1997 | Parker et al. |
| 5,602,492 A | 2/1997 | Cresswell et al. |
| 5,603,707 A | 2/1997 | Trombetta et al. |
| 5,617,023 A | 4/1997 | Skalski |
| 5,627,083 A | 5/1997 | Tounai |
| 5,629,216 A | 5/1997 | Wijaranakula et al. |
| 5,642,296 A | 6/1997 | Saxena |
| 5,646,870 A | 7/1997 | Krivokapic et al. |
| 5,649,169 A | 7/1997 | Berezin et al. |
| 5,654,903 A | 8/1997 | Reitman et al. |
| 5,655,951 A | 8/1997 | Meikle et al. |
| 5,657,254 A | 8/1997 | Sierk et al. ................ 702/138 |
| 5,661,669 A | 8/1997 | Mozumder et al. |
| 5,663,797 A | 9/1997 | Sandhu |
| 5,664,987 A | 9/1997 | Renteln |
| 5,665,199 A | 9/1997 | Sahota et al. |
| 5,666,297 A | 9/1997 | Britt et al. |
| 5,667,424 A | 9/1997 | Pan |
| 5,674,787 A | 10/1997 | Zhao et al. |
| 5,694,325 A | 12/1997 | Fukuda et al. ............. 700/121 |
| 5,698,989 A | 12/1997 | Nulman |
| 5,719,495 A | 2/1998 | Moslehi |
| 5,719,796 A | 2/1998 | Chen |
| 5,735,055 A | 4/1998 | Hochbein et al. |
| 5,740,429 A | 4/1998 | Wang et al. |
| 5,751,582 A | 5/1998 | Saxena et al. |
| 5,754,297 A | 5/1998 | Nulman |
| 5,761,064 A | 6/1998 | La et al. |
| 5,764,543 A | 6/1998 | Kennedy |
| 5,777,901 A | 7/1998 | Berezin et al. |
| 5,787,021 A | 7/1998 | Samaha |
| 5,787,269 A | 7/1998 | Hyodo |
| 5,808,303 A | 9/1998 | Schlagheck et al. |
| 5,812,407 A | 9/1998 | Sato et al. |
| 5,823,854 A | 10/1998 | Chen |
| 5,825,913 A | 10/1998 | Rostami et al. |
| 5,828,778 A | 10/1998 | Hagi et al. |
| 5,832,224 A | 11/1998 | Fehskens et al. |
| 5,838,595 A | 11/1998 | Sullivan et al. ................ 703/2 |
| 5,844,554 A | 12/1998 | Geller et al. |
| 5,857,258 A | 1/1999 | Penzes et al. |
| 5,859,964 A | 1/1999 | Wang et al. |
| 5,859,975 A * | 1/1999 | Brewer et al. ............... 709/213 |
| 5,863,807 A | 1/1999 | Jang et al. |
| 5,870,306 A | 2/1999 | Harada |
| 5,883,437 A | 3/1999 | Naruyama et al. |
| 5,889,991 A | 3/1999 | Consolatti et al. |
| 5,901,313 A | 5/1999 | Wolf et al. |
| 5,903,455 A | 5/1999 | Sharpe, Jr. et al. ........... 700/17 |
| 5,910,011 A | 6/1999 | Cruse |
| 5,910,846 A | 6/1999 | Sandhu |
| 5,916,016 A | 6/1999 | Bothra |
| 5,923,553 A | 7/1999 | Yi |
| 5,930,138 A | 7/1999 | Lin et al. |
| 5,940,300 A | 8/1999 | Ozaki |
| 5,943,237 A | 8/1999 | Van Boxem |
| 5,960,185 A | 9/1999 | Nguyen |
| 5,960,214 A | 9/1999 | Sharpe, Jr. et al. ............. 700/9 |
| 5,961,369 A | 10/1999 | Bartels et al. |
| 5,963,881 A | 10/1999 | Kahn et al. |
| 5,978,751 A | 11/1999 | Pence et al. |
| 5,982,920 A | 11/1999 | Tobin, Jr. et al. |
| 6,002,989 A | 12/1999 | Shiba et al. |
| 6,017,771 A | 1/2000 | Yang et al. |
| 6,036,349 A | 3/2000 | Gombar |
| 6,041,270 A | 3/2000 | Steffan et al. |
| 6,054,379 A | 4/2000 | Yau et al. |
| 6,064,759 A | 5/2000 | Buckley et al. |
| 6,072,313 A | 6/2000 | Li et al. |
| 6,078,845 A | 6/2000 | Friedman |
| 6,094,688 A | 7/2000 | Mellen-Garnett et al. |
| 6,097,887 A | 8/2000 | Hardikar et al. |
| 6,108,092 A | 8/2000 | Sandhu |
| 6,112,130 A | 8/2000 | Fukuda et al. |
| 6,127,263 A | 10/2000 | Parikh |
| 6,128,016 A * | 10/2000 | Coelho et al. ............... 345/808 |
| 6,136,163 A | 10/2000 | Cheung et al. |
| 6,141,660 A | 10/2000 | Bach et al. |
| 6,143,646 A | 11/2000 | Wetzel |
| 6,148,099 A | 11/2000 | Lee et al. |
| 6,148,239 A | 11/2000 | Funk et al. |
| 6,148,246 A | 11/2000 | Kawazome |
| 6,159,075 A | 12/2000 | Zhang |
| 6,159,644 A | 12/2000 | Satoh et al. |
| 6,161,054 A | 12/2000 | Rosenthal et al. |
| 6,169,931 B1 | 1/2001 | Runnels |
| 6,172,756 B1 | 1/2001 | Chalmers et al. |
| 6,173,240 B1 | 1/2001 | Sepulveda et al. |
| 6,175,777 B1 | 1/2001 | Kim |
| 6,178,390 B1 | 1/2001 | Jun |
| 6,183,345 B1 | 2/2001 | Kamono et al. |
| 6,185,324 B1 | 2/2001 | Ishihara et al. |
| 6,191,864 B1 | 2/2001 | Sandhu |
| 6,192,291 B1 | 2/2001 | Kwon |
| 6,197,604 B1 | 3/2001 | Miller et al. |
| 6,204,165 B1 | 3/2001 | Ghoshal |
| 6,210,983 B1 | 4/2001 | Atchison et al. |
| 6,211,094 B1 | 4/2001 | Jun et al. |
| 6,214,734 B1 | 4/2001 | Bothra et al. |
| 6,217,412 B1 | 4/2001 | Campbell et al. |
| 6,219,711 B1 * | 4/2001 | Chari ......................... 709/232 |
| 6,222,936 B1 | 4/2001 | Phan et al. |
| 6,226,792 B1 | 5/2001 | Goiffon et al. |
| 6,230,069 B1 | 5/2001 | Campbell et al. |

| | | |
|---|---|---|
| 6,236,903 B1 | 5/2001 | Kim et al. |
| 6,240,330 B1 | 5/2001 | Kurtzberg et al. |
| 6,240,331 B1 * | 5/2001 | Yun .......................... 700/121 |
| 6,246,972 B1 | 6/2001 | Klimasauskas |
| 6,248,602 B1 | 6/2001 | Bode et al. |
| 6,249,712 B1 | 6/2001 | Boiquaye |
| 6,252,412 B1 | 6/2001 | Talbot et al. |
| 6,253,366 B1 | 6/2001 | Mutschler, III |
| 6,263,255 B1 | 7/2001 | Tan et al. |
| 6,276,989 B1 | 8/2001 | Campbell et al. |
| 6,278,899 B1 | 8/2001 | Piche et al. |
| 6,280,289 B1 | 8/2001 | Wiswesser et al. |
| 6,284,622 B1 | 9/2001 | Campbell et al. |
| 6,287,879 B1 | 9/2001 | Gonzales et al. |
| 6,290,572 B1 | 9/2001 | Hofmann |
| 6,292,708 B1 | 9/2001 | Allen et al. |
| 6,298,274 B1 | 10/2001 | Inoue |
| 6,298,470 B1 | 10/2001 | Breiner et al. |
| 6,303,395 B1 * | 10/2001 | Nulman ........................ 438/14 |
| 6,304,999 B1 | 10/2001 | Toprac et al. |
| 6,307,628 B1 | 10/2001 | Lu et al. |
| 6,314,379 B1 | 11/2001 | Hu et al. |
| 6,320,655 B1 | 11/2001 | Matsushita et al. |
| 6,324,481 B1 | 11/2001 | Atchison et al. |
| 6,334,807 B1 | 1/2002 | Lebel et al. |
| 6,336,841 B1 | 1/2002 | Chang |
| 6,340,602 B1 | 1/2002 | Johnson et al. |
| 6,345,288 B1 | 2/2002 | Reed et al. |
| 6,345,315 B1 * | 2/2002 | Mishra ...................... 709/246 |
| 6,360,133 B1 | 3/2002 | Campbell et al. |
| 6,360,184 B1 | 3/2002 | Jacquez |
| 6,366,934 B1 | 4/2002 | Cheng et al. |
| 6,368,879 B1 | 4/2002 | Toprac |
| 6,368,883 B1 | 4/2002 | Bode et al. |
| 6,368,884 B1 | 4/2002 | Goodwin et al. |
| 6,379,980 B1 | 4/2002 | Toprac |
| 6,388,253 B1 | 5/2002 | Su |
| 6,389,491 B1 * | 5/2002 | Jacobson et al. ............. 710/10 |
| 6,395,152 B1 | 5/2002 | Wang |
| 6,397,114 B1 | 5/2002 | Eryurek et al. |
| 6,405,096 B1 | 6/2002 | Toprac et al. |
| 6,405,144 B1 | 6/2002 | Toprac et al. |
| 6,438,438 B1 | 8/2002 | Takagi et al. |
| 6,440,295 B1 | 8/2002 | Wang |
| 6,455,937 B1 | 9/2002 | Cunningham |
| 6,470,230 B1 | 10/2002 | Toprac et al. |
| 6,479,902 B1 | 11/2002 | Lopatin et al. |
| 6,479,990 B2 | 11/2002 | Mednikov et al. |
| 6,482,660 B2 | 11/2002 | Conchieri et al. |
| 6,503,839 B2 | 1/2003 | Gonzales et al. |
| 6,517,413 B1 | 2/2003 | Hu et al. |
| 6,567,717 B2 | 5/2003 | Krivokapic et al. |
| 2001/0001755 A1 | 5/2001 | Sandhu et al. |
| 2001/0003084 A1 | 6/2001 | Finarov |
| 2001/0030366 A1 | 10/2001 | Nakano et al. |
| 2001/0039462 A1 | 11/2001 | Mendez et al. |
| 2001/0040997 A1 | 11/2001 | Tsap et al. |
| 2001/0042690 A1 | 11/2001 | Talieh |
| 2002/0032499 A1 | 3/2002 | Wilson et al. |
| 2002/0058460 A1 | 5/2002 | Lee et al. |
| 2002/0070126 A1 | 6/2002 | Sato et al. |
| 2002/0081951 A1 | 6/2002 | Boyd |
| 2002/0089676 A1 | 7/2002 | Pecen et al. |
| 2002/0102853 A1 | 8/2002 | Li et al. |
| 2002/0107599 A1 | 8/2002 | Boyd et al. |
| 2002/0107604 A1 | 8/2002 | Riley et al. |
| 2002/0113039 A1 | 8/2002 | Mok et al. |
| 2002/0127950 A1 | 9/2002 | Hirose et al. |
| 2002/0128805 A1 | 9/2002 | Goldman et al. |
| 2002/0149359 A1 | 10/2002 | Cronzen et al. |
| 2002/0185658 A1 | 12/2002 | Inoue et al. |
| 2002/0193902 A1 | 12/2002 | Shanmugasundram et al. |
| 2002/0197745 A1 | 12/2002 | Shanmugasundram et al. |
| 2002/0197934 A1 | 12/2002 | Paik |
| 2002/0199082 A1 | 12/2002 | Shanmugasundram et al. |
| 2003/0020909 A1 | 1/2003 | Adams et al. |
| 2003/0020928 A1 | 1/2003 | Ritzdorf et al. |

FOREIGN PATENT DOCUMENTS

| | | |
|---|---|---|
| EP | 0 621 522 A2 | 10/1994 |
| EP | 0 747 795 A2 | 12/1996 |
| EP | 0877308 | 11/1998 |
| EP | 0 881 040 A2 | 12/1998 |
| EP | 0 895 145 A1 | 2/1999 |
| EP | 0 910 123 | 4/1999 |
| EP | 0 932 194 | 7/1999 |
| EP | 1 066 925 A2 | 1/2001 |
| EP | 1 067 757 | 1/2001 |
| EP | 1 071 128 | 1/2001 |
| EP | 1 092 505 A2 | 4/2001 |
| EP | 1072967 A3 | 11/2001 |
| EP | 1 182 526 A2 | 2/2002 |
| GB | 2 347 885 A | 9/2000 |
| JP | 61-66104 | 4/1986 |
| JP | 61-171147 | 8/1986 |
| JP | HEI 1-283934 | 11/1989 |
| JP | 3-202710 | 9/1991 |
| JP | 05-151231 | 6/1993 |
| JP | 05-216896 | 8/1993 |
| JP | 05-266029 | 10/1993 |
| JP | 06-110894 | 4/1994 |
| JP | 06-176994 | 6/1994 |
| JP | 6-184434 | 7/1994 |
| JP | 06-252236 | 9/1994 |
| JP | 06-260380 | 9/1994 |
| JP | 8-23166 | 1/1996 |
| JP | 8-50161 | 2/1996 |
| JP | HEI 8-149583 | 6/1996 |
| JP | 8-304023 | 11/1996 |
| JP | HEI 9-34535 | 2/1997 |
| JP | 9-246547 | 9/1997 |
| JP | 10-34522 | 2/1998 |
| JP | 10-173029 | 6/1998 |
| JP | HEI 11-67853 | 3/1999 |
| JP | 11-126816 | 5/1999 |
| JP | 11-135601 | 5/1999 |
| JP | 2000/183001 | 6/2000 |
| JP | 2001-76982 | 3/2001 |
| JP | 2001-284299 | 10/2001 |
| JP | 2001-305108 | 10/2001 |
| JP | 2002/9030 | 1/2002 |
| JP | WO 02/074491 | 9/2002 |
| JP | 2002-343754 | 11/2002 |
| TW | 434103 | 5/2001 |
| TW | 436383 | 5/2001 |
| TW | 455938 | 9/2001 |
| TW | 455976 | 9/2001 |
| WO | WO 95/34866 | 12/1995 |
| WO | WO 98/05066 | 2/1998 |
| WO | 0 869 652 | 10/1998 |
| WO | WO 98/45090 | 10/1998 |
| WO | WO 99/09371 | 2/1999 |
| WO | WO 99/25520 | 5/1999 |
| WO | WO 99/59200 | 11/1999 |
| WO | WO 00/00874 | 1/2000 |
| WO | WO 00/05759 | 2/2000 |
| WO | WO 00/35063 | 6/2000 |
| WO | WO 00/54325 | 9/2000 |
| WO | WO 00/79355 A1 | 12/2000 |
| WO | WO 01/15865 A1 | 3/2001 |
| WO | WO 01/18623 | 3/2001 |
| WO | WO 01/25865 | 4/2001 |

| | | |
|---|---|---|
| WO | WO 01/33277 | 5/2001 |
| WO | WO 01/33501 A1 | 5/2001 |
| WO | WO 01/52055 A3 | 7/2001 |
| WO | WO 01/52319 | 7/2001 |
| WO | WO 01/57823 A2 | 8/2001 |
| WO | WO 02/17150 A1 | 2/2002 |
| WO | WO 02/31613 A3 | 4/2002 |
| WO | WO 02/31613 A2 | 4/2002 |
| WO | WO 02/33737 A2 | 4/2002 |

OTHER PUBLICATIONS

Rampalli, Prasad, Arakere Ramesh, and Nimish Shah. 1991. CEPT—A Computer–Aided Manufacturing Application for Managing Equipment Reliability and Availability in the Semiconductor Industry. New York, New York: IEEE.

Moyne, James R., Nauman Chaudhry, and Roland Telfeyan. 1995. "Adaptive Extensions to a Multi–Branch Run–to–Run Controller for Plasma Etching." *Journal of Vacuum Science and Technology*. Ann Arbor, Michigan: University of Michigan Display Technology Manufacturing Center.

Moyne, James, Roland Telfeyan, Arnon Hurwitz, and John Taylor. Aug. 1995. "A Process–Independent Run–to–Run Controller and Its Application to Chemical–Mechanical Planarization." *SEMI/IEEE Advanced Semiconductor Manufacturing Conference and Workshop*. Ann Arbor, Michigan: The University of Michigan, Electrical Engineering & Computer Science Center for Display Technology & Manufacturing.

Dishon, G., M. Finarov, R. Kipper, J. W. Curry, T. Schraub, D. Trojan, $4^{th}$ Stambaugh, Y. Li and J. Ben–Jacob. Feb. 1996. "On–Line Integrated Metrology for CMP Processing." Santa Clara, California: VMIC Speciality Conferences, $1^{st}$ International CMP Planarization Conference.

SEMI. [1986] 1996. "Standard for Definition and Measurement of Equipment Reliability, Availability, and Maintainability (RAM)." SEMI E10–96.

Van Zant, Peter. 1997. *Microchip Fabrication: A Practical Guide to Semiconductor Processing*. Third Edition, pp. 472–478. New York, New York: McGraw–Hill.

Campbell, W. Jarrett, and Anthony J. Toprac. Feb. 11–12, 1998. "Run–to–Run Control in Microelectronics Manufacturing." Advanced Micro Devises, TWMCC.

Consilium. Aug. 1998. *Quality Management Component: QMC™ and QMC–Link™ Overview*. Mountain View, California: Consilium, Inc.

Consilium. 1998. *FAB300™*. Mountain View, California: Consilium, Inc.

Khan, Kareemullah, Victor Solakhain, Anthony Ricci, Tier Gu, and James Moyne. 1998. "Run–to–Run Control of ITO Deposition Process." Ann Arbor, Michigan.

Moyne, James and John Curry. Jun. 1998. "A Fully Automated Chemical–Mechanical Planarization Process." .

U.S. patent application Ser. No. 09/363,966, Arackaparambil et al. filed Jul. 29, 1999.

U.S. patent application Ser. No. 09/469,227, Somekh et al. filed Dec. 22, 1999.

U.S. patent application Ser. No. 09/619,044, Yuan filed Jul. 19, 2000.

SEMI. Jul. 1998. *New Standard: Provisional Specification for CIM Framework Domain Architecture*. Mountain View, California: SEMI Standards. SEMI Draft Doc. 2817.

Consilium. Jul. 1999. "Increasing Overall Equipment Effectiveness (OEE) in Fab Manufacturing by Implementing Consilium's Next–Generation Manufacturing Execution System—MES II." Semiconductor Fabtech Edition 10.

Consilium Corporate Brochure. Oct. 1999. www.consilium.com.

Consilium. Jan. 1999. "FAB300™: Consilium's Next Generation MES Solution of Software and Services which Control and Automate Real–Time FAB Operations." www.consilium.com/products/fab300_page.htm#FAB300 Introduction.

Consilium. Nov. 1999. FAB300™ Update.

SEMI. 2000. "Provisional Specification for CIM Framework Scheduling Component." San Jose, California. SEMI E105–1000.

Hu, Albert, Kevin Nguyen, Steve Wong, Xiuhua Zhang, Emanuel Sachs, and Peter Renteln. 1993. "Concurrent Deployment of Run by Run Controller Using SCC Framework." IEEE/SEMI International Semiconductor Manufacturing Science Symposium. pp. 126–132.

Hu, Albert, He Du, Steve Wong, Peter Renteln, and Emmanuel Sachs. 1994. "Application of Run by Run Controller to the Chemical–Mechanical Planarization Process." IEEE/CPMT International Electronics Manufacturing Technology Symposium. pp. 371–378.

Smith, Taber, Duane Boning, James Moyne, Arnon Hurwitz, and John Curry. Jun. 1996. "Compensating for CMP Pad Wear Using Run by Run Feedback Control." Proceedings of the Thirteenth International VLSI Multilevel Interconnection Conference. pp. 437–439.

Suzuki, Junichi and Yoshikazu Yamamoto. 1998. "Toward the Interoperable Software Design Models: Quartet of UML, XML, DOM and CORBA." Proceedings IEEE International Software Engineering Standards Symposium. pp. 1–10.

Klein, Bruce. Jun. 1999. "Application Development: XML Makes Object Models More Useful." Informationweek. pp. 1A–6A.

Chemali, Chadi E1, James Moyne, Kareemullah Khan, Rock Nadeau, Paul Smith, John Colt, Jonathan Chapple–Sokol, and Tarun Parikh. Jul. /Aug. 2000. "Multizone Uniformity Control of a Chemical Mechanical Polishing Process Utilizing a Pre–and Postmeasurement Strategy." J. Vac. Sci. Technol. A, vol. 18(4). pp. 1287–1296. American Vacuum Society.

Jensen, Alan, Peter Renteln, Stephen Jew, Chris Raeder, and Patrick Cheung. Jun. 2001. "Empirical–Based Modeling for Control of CMP Removal Uniformity." Solid State Technology, vol. 44, No. 6, pp. 101–102,104,106. Cowan Publ. Corp.: Washington, D.C.

Sarfaty, Moshe, Arulkumar Shanmugasundram, Alexander Schwarm, Joseph Paik, Jimin Zhang, Rong Pan, Martin J. Seamons, Howard Li, Raymond Hung, and Suketu Parikh. Apr./May 2002. "Advance Process Control Solutions for Semiconductor Manufacturing." IEEE/SEMI Advanced Semiconductor Manufacturing Conference. pp. 101–106.

Oct. 4, 2002. International Search Report from PCT/US01/22833.

Oct. 23, 2002. International Search Report from PCT/US01/27406.

Nov. 7, 2002. International Search Report from PCT/US02/19061.

Nov. 11, 2002. International Search Report from PCT/US02/19117.

Nov. 12, 2002. International Search Report from PCT/US02/19063.

Communication Pursuant to Article 96(2) EPC for European Patent Application No. 00 115 577.9. Jul. 23, 2002.

Williams, Randy, Dadi Gudmundsson, Kevin Monahan, Raman Nurani, Meryl Stoller and J. George Shanthikumar. Oct. 1999. "Optimized Sample Planning for Wafer Defect Inspection," *Semiconductor Manufacturing Conference Proceedings, 1999 IEEE International Symposium on Santa Clara, CA*. Piscataway, NJ pp. 43–46.

Jul. 23, 2003. Invitation to Pay Additional Fees and Communication Relating to the Results of the Partial International Search for PCT/US02/19116.

Aug. 1, 2003. Written Opinion for PCT/US01/27406.

Aug. 20, 2003. Written Opinion for PCT/US01/22833.

Oct. 15, 2002. International Search Report prepared by the European Patent Office for PCT/US02/19062.

Levine, Martin D. 1985. *Vision in Man and Machine*. New York: McGraw–Hill, Inc. pp. ix–xii, 1–58.

Pilu, Maurizio. Sep 2001. "Undoing Page Curl Distortion Using Applicable Surfaces." *IEEE International Conference on Image Processing*. Thessalonica, Greece.

May 23, 2003. Written Opinion for PCT/US01/24910.

Zhou, Zhen–Hong and Rafael Reif. Aug. 1995. "Epi–Film Thickness Measurements Using Emission Fourier Transform Infrared Spectroscopy—Part II: Real–Time in Situ Process Monitoring and Control." IEEE Transactions on Semiconductor Manufacturing, vol. 8, No. 3.

Telfeyan, Roland, James Moyne, Nauman Chaudhry, James Pugmire, Scott Shellman, Duane Boning, William Moyne, Arnon Hurwitz, and John Taylor. Oct. 1995. "A Multi–Level Approach to the Control of a Chemical–Mechanical Planarization Process." Minneapolis, Minnesota: 42$^{nd}$ National Symposium of the American Vacuum Society.

Chang, E., B. Stine, T. Maung, R. Divecha, D. Boning, J. Chung, K. Chang, G. Ray, D. Bradbury, O. S. Nakagawa, S. Oh, and D. Bartelink. Dec. 1995. "Using a Statistical Metrology Framework to Identify Systematic and Random Sources of Die–and Wafer–level ILD Thickness Variation in CMP Processes." Washington, D.C.: International Electron Devices Meeting.

Smith, Taber, Duane Boning, James Moyne, Arnon Hurwitz, and John Curry. Jun. 1996. "Compensating for CMP Pad Wear Using Run by Run Feedback Control." Santa Clara, California: VLSI Multilevel Interconnect Conference.

Boning, Duane, William Moyne, Taber Smith, James Moyne, Roland Telfeyan, Arnon Hurwitz, Scott Shellman, and John Taylor. Oct. 1996. "Run by Run Control of Chemical–Mechanical Polishing." *IEEE Trans. CPMT (C)*, vol. 19, No. 4, pp. 307–314.

Edgar, Thomas F., Stephanie W. Butler, Jarrett Campbell, Carlos Pfeiffer, Chris Bode, Sung Bo Hwang, and K.S. Balakrishnan. May 1998. "Automatic Control in Microelectronics Manufacturing: Practices, Challenges, and Possibilities." Automatica, vol. 36, pp. 1567–1603, 2000.

Chemali, Chadi El, James Moyne, Kareemullah Khan, Rock Nadeau, Paul Smith, John Colt, Jonathan Chapple–Sokol, and Tarun Parikh. Nov. 1998. "Multizone Uniformity Control of a CMP Process Utilizing a Pre and Post–Measurement Strategy." Seattle, Washington: SEMETECH Symposium.

Moyne, James. Oct. 1999. "Advancements in CMP Process Automation and Control." Hawaii: (Invited paper and presentation to) Third International Symposium on Chemical Mechanical Polishing in IC Device Manufacturing: 196$^{th}$ Meeting of the Electrochemical Society.

Lee, Brian, Duane S. Boning, Winthrop Baylies, Noel Poduje, Pat Hester, Yong Xia, John Valley, Chris Koliopoulos, Dale Hetherington, HongJiang Sun, and Michael Lacy. Apr. 2001. "Wafer Nanotopography Effects on CMP: Experimental Validation of Modeling Methods." San Francisco, California: Materials Research Society Spring Meeting.

NovaScan 2020. Feb. 2002. "Superior Integrated Process Control for Emerging CMP High–End Applications."

International Search Report from PCT/US01/24910, completed Jul. 9, 2002.

Ostanin, Yu Ya. Oct. 1981. "Optimization of Thickness Inspection of Electrically Conductive Single–Layer Coatings with Laid–on Eddy–Current Transducers (Abstract)," *Defektoskopiya*, vol. 17, No. 10, pp. 45–52, Moscow, USSR.

Feb. 1984. "Substrate Screening Process," *IBM Technical Disclosure Bulletin*, pp. 4824–4825.

Hermann, D. 1988. "Temperature Errors and Ways of Elimination for Contactless Measurement of Shaft Vibrations (Abstract)," *Technisches Messen®*, vol. 55, No. 1, pp. 27–30. West Germany.

Lin, Kuang–Kno and Costos J. Spanos. Nov. 1990. "Statistical Equipment Modeling for VLSI Manufacturing: An Application for LPCVD," *IEEE Transactions on Semiconductor Manufacturing*, v. 3, n. 4, ppp. 216–229.

Chang, Norman H. and Cosias J. Spanos. Feb. 1991. "Continuous Equipment Diagnosis Using Evidence Integration: An LPCVD Application." *IEEE Transactions on Semiconductor Manufacturing*, v. 3, n. 4, pp. 216–229.

Larrabee, G.B. May 1991. "The intelligent Microelectronics Factory of the Future (Abstract)," *IEEE/SEMI International Semiconductor Manufacturing Science Symposium*, pp. 30–34, Burlingame, CA.

Burk, Peter A. Jun. 1991. "Semi–Emperical Modelling of SiO2 Chemical–Mechanical Polishing Planarization." *VMIC Conference, 1991 IEEE*, pp. 379–384. IEEE.

May 1992. "Laser Ablation Endpoint Detector," *IBM Technical Disclosure Bulletin*, pp. 333–334.

Spanos, Costas J., Hsi–Fang Guo, Alan Miller, and Joanne Levine–Parrill. Nov. 1992. "Real–Time Statistical Process Control Using Tool Data." *IEEE Transactions on Semiconductor Manufacturing*, v. 5, n. 4, pp. 308–318.

Feb. 1993, "Electroless Plating Scheme to Hermetically Seal Copper Features" *IBM Technical Disclosure Bulletin*, pp. 405–406.

Scarr, J.M. and J. K. Zelisse. Apr. 1993. "New Topology for Thickness Monitoring Eddy Current Sensors (Abtract)." *Proceedings of the 36$^{th}$ Annual Technical Conference*, Dallas, Texas.

Matsuyama, Akira and Jesse Niou. 1993. "A State–of–the–Art Automation System of an ASIC Wafer Fab in Japan." *IEEE/SEMI International Semiconductor Manufacturing Science Symposium*, pp. 42–47.

Yeh, C. Eugene, John C. Cheng and Kwan Wong. 1993. "Implementation Challenge of a Feedback Control System for Wafer Fabrication," *IEEE/CHMT International Electronics Manufacturing Technology Symposium*, pp. 438–442.

Kurtzberg, Jerome M. and Menachem Levanoni. Jan. 1994. "ABC: A Better Control for Manufacturing," *IBM Journal of Research and Development*, v. 38, n. 1, pp. 11–30.

Mozunder, Pornendu K. and Gabriel G. Barns. Feb. 1994. "Statistical Feedback Control of a Plasma Etch Process." *IEEE Transactions on Semiconductor Manufacturing*, v. 7, n. 1, pp. 1–11.

Muller–Heinzerling, Thomas, Ulrich Neu. Hans Georg Nurnberg and Wolfgang May. Mar. 1994. "Recipe–Controlled Operation of Batch Processes with Batch X." *ATP Automatisierungstechnische Praxis*, vol. 36, No. 3, pp. 43–51.

Stoddard, K;P. Crouch M. Kozicki, and K. Tsakalis. Jun.–Jul. 1994."Application of Feedforward and Adaptive Feedback Control to Semiconductor Device Manufacturing (Abstract)." *Proceedings of 1994 American Control Conference–ACC '94*, vol. 1, pp. 892–896. Baltimore, Maryland.

Schaper, C.D., M.M. Moslehi, K.C. Saraswat, and T. Kailath. Nov. 1994. "Modeling, Identification, and Control of Rapid Thermal Processing Systems (Abstract)," *Journal of the Electrochemical Society*, vol. 141, no. 11, pp. 3200–3209.

Tao, K.M., R.L. Kosut, M. Ekblad, and G. Aral, Dec. 1994, "Feedforward Learning Applied to RTP of Semiconductor Wafers (Abstract)," *Proceedings of the 33$^{rd}$ IEEE Conference on Decision and Control*, vol. 1, pp. 67–72. Lake Buens Vista, Florida.

Hu, Albert, He Du, Steve Wong, Peter Ranteln, and Emmanuel Sachs. 1994. "Application of Run by Run Controller to the Chemical–Mechanical Planarization Process." *IEEE/CPMT International Electronics Manufacturing Technology Symposium*, pp. 371–378.

Spanos, C.J., S. Leang, S.–Y. Ma, J. Thomson, B. Bombay, and X. Niu, May 1995. "A Multistep Supervisory Controller for Photolithographic Operations (Abstract)," *Proceedings of the Symposium on Process Control, Diagnostics, and Modeling in Semiconductor Manufacturing*, pp. 3–17.

Leang, Sovarong, Sheng–Yi Ma, John Thomson, Bart John Bombay, and Costas J. Spanos. May 1996. "A Control System for Photolithographic Sequences," *IEEE Transactions on Semiconductor Manufacturing*, vol. 9, No. 2.

Boning, Duano S., William P. Moyne, Taber H. Smith, James Moyne, Ronald Telfeyan, Arnon Hurwitz, Scott Shellman, and John Taylor. Oct. 1996. "Run by Run Control of Chemical–Mechanical Polishing," *IEEE Transactions on Components, Packaging, and Manufacturing Technology*–Part C, vol. 19, No. 4, pp. 307–314.

Zho, Ning, J.R. Moyne, T. Smith D. Boning, E. Del Castillo, Yeh Jinn–Yi, and Hurwitz. Nov. 1996. "A Comparative Analysis of Run–to–Run Control Algorithms in Semiconductor Manufacturing Industry (Abstract)." *IEEE/SEMI 1996 Advanced Semiconductor Manufacturing Conferences Workshop*, pp. 375–381.

Yasuda, M., T. Osaka, and M. Ikeda. Dec. 1996. "Feedforward Control of a Vibration Isolation System for Disturbance Suppression (Abstract),"*Proceeding of the 35$^{th}$ IEEE Conference on Decision and Control*, vol. 2, pp. 1229–1233, Kobe, Japan.

Fan, Jr–Min, Ruey–Shan Guo, Shi–Chung Chang, and Kian–Huei Lee. 1996. "Abnormal Tred Detection of Sequence–Disordered Data Using EWMA Method," *IEEE/CPMT International Electronics Manufacturing Technology Symposium*pp. 355–363.

Smith, Taber and Duane Boning. 1996. "A Self–Turning EWMA Controller Utilizing Artificial Neural Network Functions Approximation Techniques," *IEEE/CPMT International Electronics Manufacturing Technology Symposium*, pp. 355–363.

Guo, Ruey–Shan, Li–Shia Huang, Argon Chen, and Jin–Jung Chen. Oct. 1997. "A Cost–Effective Methodology for a Run–by–Run EWMA Controller." *6$^{th}$ International Symposium on Semiconductor Manufacturing*, pp. 61–64.

Mullins, J.A., W.J. Campbell, and A.D. Stock. Oct. 1997. "An Evaluation of Model Predictive Control in Run–to–Run EWMA Processing in Semiconductor Manufacturing (Abstract)." *Proceedings of the SPIE–The International Society for Optical Engineering Conference*, vol. 3213, pp. 182–189.

Reitman, E.A., D.J. Friedman, and E.R. Lory, Nov. 1997, "Pre–Production Results Demonstrating Multiple–System Models for Yield Analysis (Abstract)," *IEEE Transactions on Semiconductor Manufacturing*,vol. 10, No. 4, pp. 469–481.

Durham, Jim and Myriam Roussal. 1997. "A Statistical Method for Correlating In–Line Defectivity to Probe Yield." *IEEE/SEMI Advanced Semiconductor Manufacturing Conference*, pp. 76–77.

Shindo, Wataru, Eric H. Wang, Ram Akella, and Andrzej J. Strojwas. 1997. "Excursion Detection and Source Isolation in Defect Inspection and Classification." *2$^{nd}$ International Workshop on Statistical Metrology*, pp. 90–93.

Jul. 1998, "Active Controller: Utilizing Active Databases for Implementing Multistep Control of Semiconductor Manufacturing (Abstract)," *IEEE Transactions on Components, Packaging and Manufacturing Technology*–Part C, vol. 21, No. 3, pp. 217–224.

Fang, S.J., A. Barda, T. Janecko, W. Little, D. Oufley, G. Hempel, S. Joshi, B. Morrison, G.B. Shinn, and M. Birang, 1998. "Control of Dielectric Chemical Mechanical Polishing (CMP) Using and Interferometry Based Endpoint Sensor," *International Proceedings of the IEEE Interconnect Technology Conference*, pp. 76–78.

Ouma, Dennis, Duane Boning, James Chung, Greg Shinn, Leif Olsen, and John Clark. 1998, "An Integrated Characterization and Modeling Methodology for CMP Dielectric Planarization." *Proceedings of the IEEE 1998 International Interconnect Technology Conference*, pp. 67–69.

Boning, Duane S., Jerry Stefani, and Stephanie W. Butler. Feb. 1999. "Statistical Methods for Semiconductor Manufacturing." *Encyclopedia of Electrical Engineering*, I.G. Webster, Ed.

McIntosh, John. Mar. 1999. "Using CD–SEM Metrology in the Manufacture of Semiconductors (Abstract)." *JOM*, vol. 51, No. 3, pp. 38–39.

Pan, J. Troy, Ping Li, Kapila Wijkoon, Stan Tsai, and Fritz, Radaker, May 1999. "Copper CMP Integration and Time Dependent Pattern Effect," *IEEE 1990 International Interconnect Technology Conference*, pp. 164–166.

Mecki, P.H. and K. Umemoto. Aug. 1999. "Achieving Fast Motions in Semiconductor Manufacturing Machinery (Abstract)," *Proceedings of the 1999 IEEE International Conference on Control Applications*, vol. 1, pp. 725–729. Kohaka Coast, HI.

Khan, K., C. El Chemali, J. Moyne, J. Chapple–Sokol, R. Nadeau P. Smith, C., and T. Parikh. Oct. 1999. "Yield Improvement at the Contact Process Through Run–to Run Control (Abstract)," *24$^{th}$ IEEE/CPMT Electronics Manufacturing Technology Symposium*, pp. 258–263

Ruegregger, Steven, Aaron Wagner, James S. Freudenberg, and Dennis S, Grimard. Nov. 1999. "Feedforward Control for Reduced Run–to–Run Verification in Microelectronics Manufacturing," *IEEE Transactions on Semiconductor Manufacturing*, vol. 12, No. 4.

Nov. 1999, "How to Use EWMA to Achieve SPC and EPC Control." *International Symposium on NDT Contribution to the Infrastructure Safety Systems*, Tores, Brazil. <http://www.odt.net/abstract/ndtiss99/data/35.htm>.

Edgar, T.F., W.J. Campbell, and C. Bode, Dec. 1999. "Model–Based Control in Microelectronics Manufacturing," *Proceedings of the 38$^{th}$ IEEE Conference on Division and Control*, Phoenix, Arizona, vol. 4, pp. 4185–4191.

Mecki, P.H. and K. Umamoto. Apr. 2000. "Achieving Fast Motions by Using Shaped Reference Inputs [Semiconductor Manufacturing Machine] (Abstract)," *NEC Research and Development*, vol. 41, No. 2, pp. 232–237.

Oechsner, R.T. Tschaftiary, S. Sommer, L. Pfitzner, H. Rystel, H. Gerath, C. Baier and M. Hafner. Sep. 2000, "Feed–forward Control for Lithography/Etch Sequence (Abstract)," *Proceedings of the SPIE–The International Society for Optical Engineering Conference*, vol. 4182, pp. 31–39.

Chaung, Robin. Oct. 18, 2000. "Copper Interconnect Technology," *AVS/CMP User Group Meeting*, Santa Clara, CA.

Edgar, Thomas F., Stephanie W. Butler, W. Jarrett Campbell, Carlos Pfeiffer, Christopher Bode, Sung Bo Hwang, K.S. Balakrishman, and J. Hahn. Nov. 2000, "Automatic Control in Microelectronics Manufacturing: Practices, Challenges, and Possibilites (Abstract)." *Automatica* v. 36, n. 11.

Khan, S., M. Musavi, and H. Reason. Nov. 2000. "Critical Dimension Control in Semiconductor Manufacturing (Abstract)," *ANNIE 2000, Smart Engineering Systems Design Conference*, pp. 995–1000. St. Louis, Missouri.

ACM Research Inc, 2000, "Advanced Copper Metallization for 0.13 to 0.05 μm & Beyond." <http://acmrc.com/press/ACM–ECP–brochure–pdf>.

Ravid, Avi, Avner Sharom, Amit Weingarten, Vladimir Machavariani, and David Scheiner. 2000. "Copper CMP Planarity Control Using ITM." *IEEE/SEMI Advanced Semiconductor Manufacturing Conference*, pp. 437–443.

Chen, Argon and Ruey–Shan Guo. Feb. 2001. "Age–Based Double EWMA Controller and Its Application to CMP Processes," *IEEE Transactions on Semiconductor Manufacturing*, vol. 14, No. 1, pp. 11–19.

Tobin, K.W., T.P. Karnowaki, L.F. Arrowood, and F. Lakhani, Apr. 2001 "Field Test Results of an Automated Image Retrieval System (Abstract)." *Advanced Semiconductor Manufacturing Conference, 2001 IEEE/SEMI*, Munich, Germany.

Tan, K.K, H.F. Dou, and K.Z. Tang. May–Jun. 2001. "Precision Motion Control System for Ultra–Precision Semiconductor and Electronics Components Manufacturing (Abstract)," *51$^{st}$ Electronic Components and Technology Conference 2001. Proceedings*, pp. 1372–1379. Orlando, Florida.

Heuberger, U. Sep. 2001. "Coating Thickness Measurement with Dual–Function Eddy–Current & Magnetic Inductance Instrument (Abstract)." *Galvantechnik*, vol. 92, No. 9, pp. 2354–2366+IV..

Wang, LiRen and Hefin Rowlands. 2001. "A Novel NN–Puzzy–SPC Feedback Control System." *8$^{th}$ IEEE International Conference on Emerging Technologies and Factory Automation*, pp. 417–423.

Moyne, J., V. Solakhiau, A. Yershov, M. Anderson, and D. Mockler–Hebert. Apr.–May 2002. "Development and Deployment of a Multi–Component Advanced Process Control System for an Epitaxy Tool (Abstract)." *2002 IEEE Advanced Semiconductor Manufacturing Conference and Workshop*, pp. 125–130.

Sarfaty, M., A. Shanmugasundram, A. Schwarm, J. Paik, Jimin Zhang, Rong Pan, M.J. Seamons, H. Li, R. Hung, and S. Parikh. Apr.–May 2002. "Advance Process Control Solutions for Semiconductor Manufacturing (Abstract)." *13$^{th}$ Annual IEEE/SEMI Advanced Semiconductor Manufacturing Conference. Advancing the Science and Technology of Semiconductor Manufacturing ASMC 2002*, pp. 101–106. Boston, MA.

Campbell, W.J., S.K. Firth. A.J. Toprac, and T.F. Edgar. May 2002. "A Comparison of Run–to–Run Control Algorithms (Abstract)." *Proceedings of 2002 American Control Conference*, vol. 3, pp. 2150–2155.

Good, Richard and S. Joe Qin. May 2002. "Stability Analysis of Double EWMA. Run–to–Run Control with Metrology Delay," *IEEE/CPMT International Electronics Manufacturing Technology Symposium*, pp. 355–363.

Smith, Stewart, Anthony J. Walton, Alan W.S. Ross, Georg K. H. Bodammer, and J.T.M. Stevenson. May 2002. "Evaluation of Sheet Resistance and Electrical Linewidth Measurement Technique for Copper Damascene Interconnect." *IEEE Transactions on Semiconductor Manufacturing*, vol. 15, No. 2, pp. 285–287.

Itabashi, Takeyuki, Hiroshi Nakano, and Harvo Akahoshi. Jun. 2002. "Electroless Deposited CoWB for Copper Diffusion Barrier Metal." *IEEE International Interconnect Technology Conference*, pp. 285–287.

ACM Research, Inc. 2002. "ACM Ultra ECP® System: Electro–Copper Plating (ECP) Deposition." www.acmrc.com/ecp.html.

Applied Materials, Inc. 2002. "Applied Materials: Information for Everyone: Copper Electrochemical Plating." www.appliedmaterials.com/products/copper_electrochemical_plating.html.

KLA–Tencor Corporation. 2002, "KLA Tencor; Press Release: KLA–Tencor Introduces First Production–Worthy Copper CMP In–Situ Film Thickness and End–point Control System: Multi–Million Dollar Order Shipped to Major CMP Tool Manufacturer." www.kia–tencor.com/news_events/press_releases/press_releases2001/984086002.html.

Takahashi, Shingo, Kaori Tai, Hijzu Ohtorii, Naoki Komai, Yuji Sagawa, Hiroshi Horikoshi, Zenya Yasuda, Hiroshi Yamada, Masao Ishiharam and Takeshi Nogami. 2002. "Fragile Porous Low–k/Copper Integration by Using Electro–Chemical Polishing," *2002 Symposium on VLSI Technology Digest of Technical Papers*, pp. 32–33.

Cunningham, James A. 2003. "Using Electrochemistry to Improve Copper Interconnects." <http://www.–e–insite.net/semiconductor/indexasp?layoutarticle&articleideCA47-465>.

Mar. 25, 2003. International Search Report for PCT/US02/24859 prepared by the European Patent Office.

Adams, Bret W., Bogdan Swedek, Rajesv Bajaj, Fritz Redeker, Manush Birang, and Gregory Amico. "Full–Wafer Endpoint Detection Improves Process Control in Copper CMP." *Semiconductor Fabtech –12th* Edition. Applied Materials, Inc., Santa Clara, CA.

Berman, Mike, Thomas Bibby, and Alan Smith, "Review of In Situ & In–limo Desection for CMP Applications." *Semiconductor Fabtech*, 8th Edition, pp. 267–274.

"Semiconductor Manufacturing: As Overview." <http://users.ecc.gatech.edu/–graxyloverview.html>.

Feb. 1984. "Method and Apparatus of in Situ Measurement and Overlay Error Analysis for Correcting Step and Repeat Lithographic Cameras." *IBM Technical Disclosure Bulletin*, pp. 4855–4859.

Oct. 1984. "Method to Characterize the Stability of a Step and Repeat Lithographic System." *IBM Technical Disclosure Bulletin*, pp. 2857–2860.

Schmid, Hans Albrecht. 1995. "Creating the Architecture of a Manufacturing Framework by Design Patterns." Austin, Texas: OOPSLA.

Baliga, John. Jul. 1999. "Advanced Process Control: Soon to be a Must." Cahners Semiconductor International. www.semiconductor.net/semiconductor/issues/issues/1999/jul99/docs/feature1.asp.

Jul. 5, 2001. "Motorola and Advanced Micro Devices Buy ObjectSpace Catalyst Advanced Process Control Product for Five Wafer Fabs." Semiconductor FABTECH. www.semiconductorfabtech.com/industry.news/9907/20.07.shtml.

Oct. 15, 2001. Search Report prepared by the Austrian Patent Office for Singapore Patent Application No. 200004286–1.

Johnson, Bob. Jun. 10, 2002. "Advanced Process Control Key to Moore's Law." Gartner, Inc.

Jul. 29, 2002. International Search Report prepared by the European Patent Office for PCT/US01/27407.

Sonderman, Thomas. 2002. "APC as a Competitive Manufacturing Technology: *AMD's Vision for 300mm*." AEC/APC.

* cited by examiner

GENERIC INTERFACE BUILDER

FIELD OF THE INVENTION

The present invention relates generally to manufacturing automation and specifically to software for automation of semiconductor manufacturing.

BACKGROUND OF THE INVENTION

Semiconductor manufacturing is an increasingly complex, multi-step process that is subject to strict manufacturing requirements (e.g., tight manufacturing tolerances) and schedules. This manufacturing is typically carried out in large fabrication facilities, often costing billions of dollars to construct. These facilities typically incorporate dozens of tools (including software, devices and various systems) involved in the various stages of the manufacturing process.

Semiconductor chips that are manufactured from the facilities mentioned above are formed through a serial photolithography process that may require hundreds of steps to form a finished chip. Every step in the process must be closely monitored, materials carefully regulated, and timing carefully controlled. Due to the high cost of building a fabrication facility, maximizing the efficiency of these facilities is particularly important. The sequencing of steps, scheduling of materials, and other process parameters vary with the particular chip being manufactured. Automation is critical to running a semiconductor fabrication facility effectively, and manufacturing automation software, such as Consilium, Inc.'s FAB300 ® manufacturing execution system (in its various versions), enables integrated management of the entire process. (Consilium, of Mountain View, Calif., is a company of Applied Materials, Inc., of Santa Clara, Calif.). An important aspect in facilitating this efficiency is the integration of the various tools in the fabrication facility to establish a smooth manufacturing assembly. Due in part to the various factors indicated above, integration is a significant challenge.

It may be desirable that a manufacturing execution system (MES) allow managers to control the entire manufacturing process, including various aspects such as tool management, materials management, data management, scheduling, etc., in a centralized manner. In many cases it is preferable that an MES allow the entire manufacturing operation to be run from a single software user interface; however, existing systems often incorporate a variety of interfaces. The tools that are used in a fabrication facility may come from a variety of manufacturers and incorporate a variety of interfaces, communication protocols, etc.

Due to the lack of standardization across tools, incorporating the tools into an MES to allow the software to deliver process instructions and receive production data may require complex, individual programming for each tool. Typically, to link each tool into the MES, a semiconductor manufacturer must create a customized software interface between the tools and the MES. To do this, the systems integrator must be familiar with the source code of the MES. Also, even when a standard protocol is used, each tool must be individually tied in to the system essentially manually. For example, a facility may select one of several material control systems commercially available from different vendors as a component of its manufacturing assembly. Each material control system may have its own set of commands and communication protocols. A systems integrator at the fabrication facility will write special software to allow the selected material control system to function in the fabrication facility's manufacturing environment (i.e., to tie it in with the MES). The requirements of the software will depend on the specific material control system selected. Moreover, due to the lack of standardization, each new component should be carefully tested before being released into the system. Particularly given the number of tools typically involved, tying the tools in this way is an expensive, time-consuming process. The resulting system is unwieldy and inconsistent and diminishes the ability of the MES to provide a single, controllable definition of the manufacturing process and to maximize the active production time of the facility.

Consequently, there is a need for "plug-and-play" operability of semiconductor manufacturing tools with respect to an MES, preferably utilizing a common graphical user interface for all components. Accordingly, there is a need for a system that substantially or fully automates and standardizes the process of integrating tools into an MES in a uniform way.

SUMMARY OF THE INVENTION

The present invention addresses the issues mentioned above by providing a system, method and medium for generating an interface adapter to facilitate communication between tools and a centralized manufacturing execution system (MES). As contemplated by embodiments of the present invention, the interface adapter then allows a tool (which can be, e.g., a system performing a function) in a semiconductor manufacturing assembly to communicate with other hardware and software in the centralized MES in accordance with a standard protocol and to be operable from a common view graphical user interface (or common set of interfaces). In one aspect of the invention (and environments used therewith), the interface adapter handles asynchronous calls or long-running service requests to the material control system, while passing through synchronous calls. In an exemplary embodiment, the interface adapter functions as a Microsoft® Transaction Server (MTS) component on an MTS server.

By way of example, embodiments of the present invention will be explained herein with regard to a material control system as the exemplary tool being integrated into the manufacturing assembly. The material control system uses, in various embodiments, COM-based interface methods (optionally including a COM-based protocol converter), exposing its interface methods via a type library. In generating the interface adapter, the present invention identifies the type library and desired parameters of the material control system, maps the COM-based interface methods of the material control system to the interface of the MES, and, e.g., handles long running service request support.

BRIEF DESCRIPTION OF THE DRAWINGS

For a fuller understanding of the present invention, reference should be made to the following detailed description taken in connection with the accompanying drawings, not drawn to scale, in which the same reference numerals indicate the same or similar parts, wherein.

DETAILED DESCRIPTION

Figure 1:
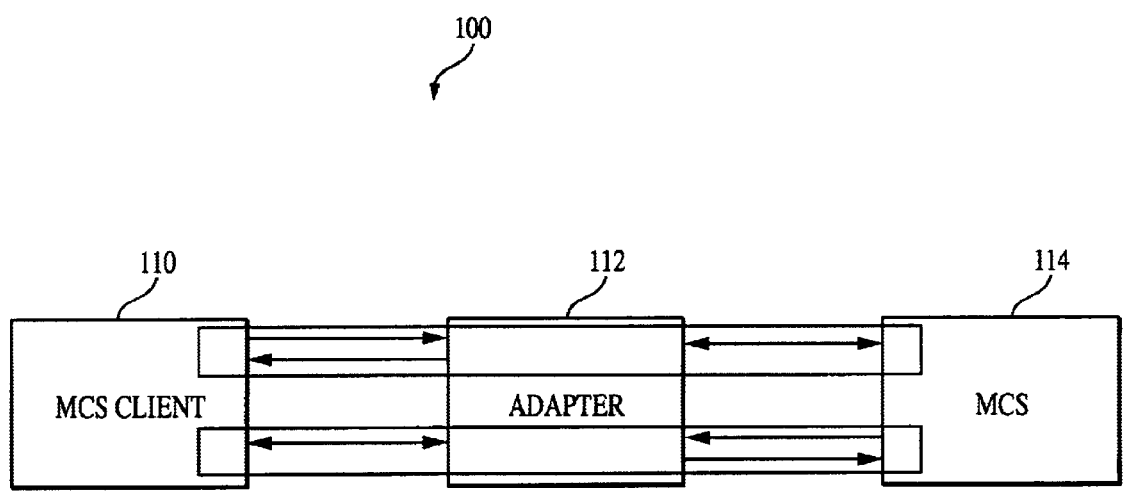
FIG. 1 is a block diagram of exemplary manufacturing components, as contemplated by embodiments of the present invention.

In FIG. 1, a block diagram of exemplary manufacturing components (including an MES [or portion thereof] and a tool) 100 contemplated for use in environments with (and/or as part of) the present invention is shown. Referring now to FIG. 1, manufacturing components 100 include a material control system client 110, and a generic interface adapter 112 to interface with a material control system (MCS) 114. In this example, the MCS client 110 and a generic interface adapter 112 are contemplated to be part of the MES, while the MCS is envisioned to be an exemplary tool. Although the tool shown here is MCS 114, it should be understood that the tool may be any tool, including a system, software or device tied to an MES (or like device). Embodiments of the present invention contemplate that the tool can be any event-based Distributed Common Object Model object.

Continuing the description of the exemplary components 100, MCS 114 tracks and transfers the movement of materials through the fabrication facility. Generally, the MES manages dispatching of tools to complete jobs in the facility workflow and will use an adapter like adapter 112 to communicate with tools as necessary. For example, to dispatch tools for performing a boron implant in a lot, the MES may go through a series of steps. Initially, an implanter tool (not shown), for example, notifies the MES that it is available and joins the dispatch list as waiting for work. Independently, a lot of materials notifies the MES that it requires a boron implant and joins the dispatch list as waiting for a boron implant. Subsequently, the MCS client 110 portion of the MES determines whether the waiting lot can run on a particular implanter and launches a job once the availability is confirmed. The MCS client 110 calls some of the necessary services to complete the job, including invoking the MCS 114 (to transfer the lot to the implanter) through the generic interface adapter 112.

Figure 2:
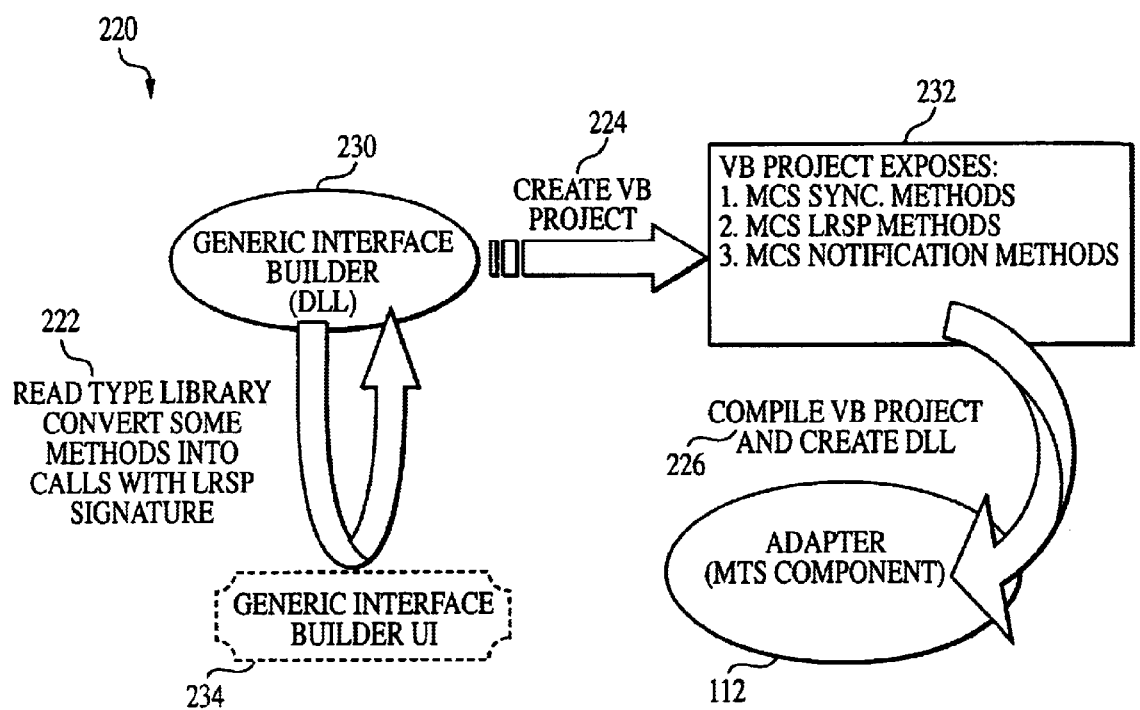
FIG. 2 is a flow diagram of generating a generic interface adapter, as contemplated by embodiments of the present invention.

Shown in the flow diagram 220 of FIG. 2, the generic interface builder 230 generates the generic interface adapter 112 that is used to communicate between the MCS client 110 and the MCS 114. In step 222, the generic interface builder 230 reads a file that defines the interface to the MCS 114, and allows a user to select various parameters and classify methods. Depending on the method and the circumstances involved, a particular handling protocol will be selected for the method, (which the adapter will then ultimately use to allow communications between the MCS client 110 and MCS 114). An exemplary protocol, which is selected where the method is recognized as one that takes a relatively significant time to complete (e.g., transporting materials from one factory location to another) is a "long running service protocol" (LRSP). Thus, this would be chosen for those methods deemed to require long running service protocol support. In some embodiments contemplated by the present invention, as a default, methods may be assumed to be handled by a "synchronous" protocol if not otherwise identified. In any event, once the protocols for the methods are chosen, the present invention generates and compiles the appropriate program code (steps 224 and 226) for the generic interface adapter 112.

Embodiments of the present invention contemplate that the MCS 114 can be a Distributed Common Object Model (DCOM or COM)-based system. The interface to the MCS 114 is envisioned as being defined as a COM type library. The COM type library includes the COM methods that the MCS 114 employs and that can be invoked by an MCS client 110.

Figure 3:
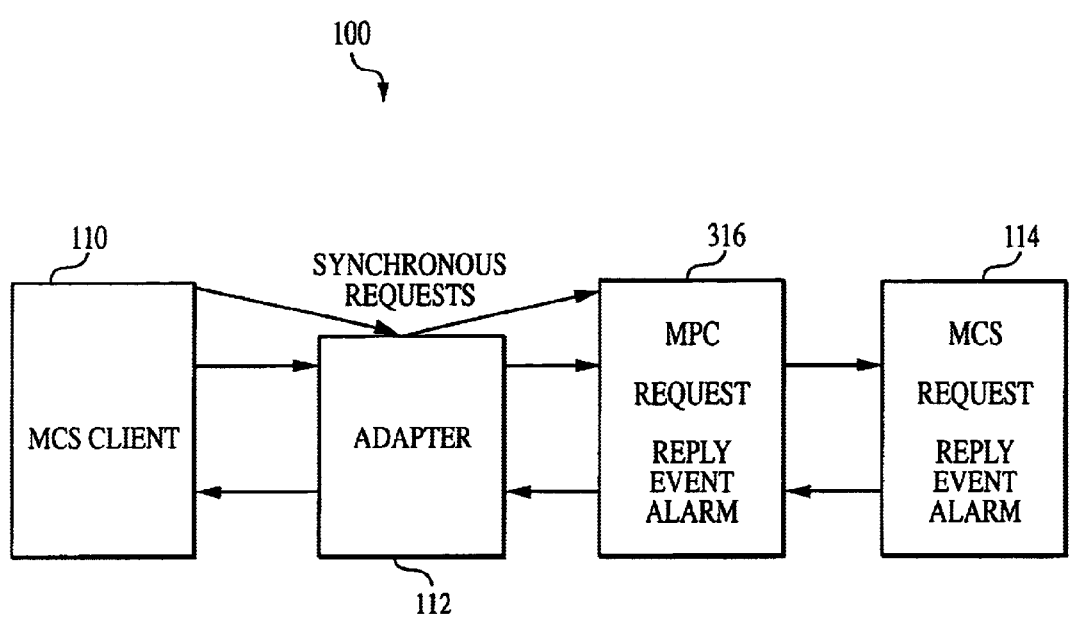
FIG. 3 is a block diagram of a MES incorporating a generic interface adapter, wherein a material control system further includes a manufacturing control system protocol converter.

Illustrated in FIG. 3, it is envisioned that where the MCS interface is not inherently defined as a COM type library, the MCS 114 may incorporate a protocol converter (MPC) 316 that provides the MCS's COM type library. The protocol converter 316 may convert between protocols such as a native TCP/IP interface for MCS 114 and the COM type library interface contemplated, in some embodiments, for communicating with the generic interface adapter 112. Preferably, the MCS's COM type library is defined in Interface Definition Language, which is defined in the Microsoft® Developers' Documentation Library. Moreover, the MCS 114 is envisioned to be an event-based system that can handle transactions asynchronously, informing the MCS client 110 when a particular task is completed or when an event occurs.

Figure 4:
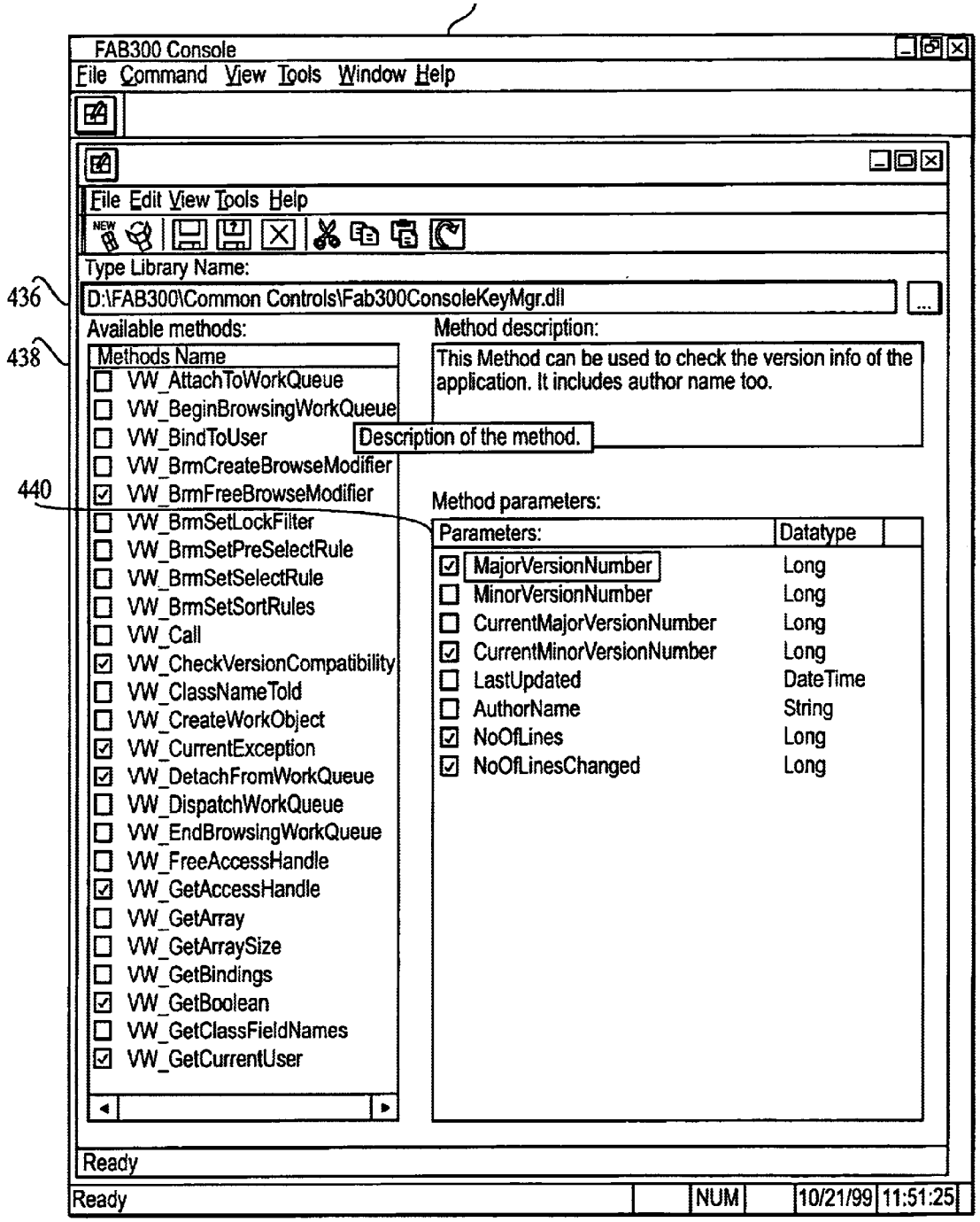
FIG. 4 is a view of an exemplary user interface in accordance with embodiments of the present invention.

Embodiments of the present invention contemplate that the generic interface builder 230 can also be a COM component, and is invoked through the MES. It is envisioned that the generic interface builder 230, includes a generic interface builder visual interface 234, such as exemplary graphical user interface 430, as shown in FIG. 4. Referring now to FIG. 4, the exemplary graphical user interface 430 depicted therein is shown as providing a prompt 436 to the user to specify the path and file name of the MCS's type library. The generic interface builder 230 reads the type library and displays the MCS's COM methods 438 with input and output parameters 440 to the user. For example, for a method that relates to moving a lot from a source to a destination, the related parameters may include a source machine and a source port, a destination area, a destination machine, and a destination port. The user then selects handling protocols for the methods, such as by specifying which methods will require long-running service support. For these methods, the user defines certain parameters, such as transaction identification numbers that will be used to correlate messages that relate to the same longrunning service requests. The user may also identify certain parameters as keys that the MCS 114 may include in its notification when it completes servicing a method service request. The keys may also be used to correlate messages that relate to the same long-running service requests, in the absence of, or, in addition to, identification numbers. For the previous example, the keys may include the destination area, the destination machine, and the destination port. (The concept of long running service support is also described, later herein.) The user then saves the configuration information that relates to the selected handling protocols, parameters, and keys. Alternatively, the step of identifying different types of methods and defining parameters and keys could be automated. For example, it could be carried out by an expert system or the information could be included in the type library.

The generic interface builder 230 uses the saved configuration information to generate the appropriate software code (e.g., in the form of a Visual Basic project) for the generic interface adapter 112 for the MCS 114. In the example herein, the generic interface builder 230 generates the adapter 112 to communicate with both the MCS client 110 and the MCS 114. The adapter 112 is provided with routines for handling the various types of communication in the system. Embodiments of the present invention contemplate that the communication methods of the MCS client 110 are known beforehand and coded into the generic interface builder 230, to ultimately be coded into the adapter 112. The COM methods of the MCS 114, from the COM type library, are modified or wrapped using the configuration information and the communication methods of the MCS client 110 to create a modified type library of COM methods for the MCS 114 that include information needed for interaction with the MCS client 110. This information typically will relate to long-running service request support. For asynchronous requests, for example, transaction identification numbers may be associated with the corresponding COM methods. The modified type library is incorporated into the adapter 112. The adapter 112 also has a type library that defines its interface, which incorporates the modified type library of MCS 114. The type library of the adapter 112 defines the services that are available to the MCS client 110 to run the adapter 112 and to execute MCS 114 actions. The type library of the adapter 112 will be registered via the operating system of the MCS client 110 (which can be, for example, Microsoft Windows NT®) to inform the client 110 of which methods are available. Subsequently (as indicated above), the generic interface builder 230 compiles the generated Visual Basic project 232 to generate the generic interface adapter 112. Although Visual Basic is mentioned herein, it should be understood that any other suitable language may also be used.

The interface adapter 112 is preferably a Microsoft® Transaction Server (MTS) component. Implementation on a Microsoft® Transaction Server is preferred for robustness and scalability, but any suitable implementation may be used. It is contemplated in some embodiments that the interface methods of the MCS 114 that may be invoked from the MCS client 110 are of these types: synchronous, asynchronous or long-running service protocol requests (LRSP), and register for notification requests.

The generic interface adapter 112 also supports three classes of interface methods outgoing from the MCS 114 to the MCS client 110: notification/reply, events and alarms. These methods may be associated with a service handling protocol, such as the LRSP. The generic interface adapter 112 itself employs three categories of COM server interface methods: those corresponding to the MCS's type library (which may pass optionally through the MPC as indicated in FIG. 2), those for invoking its LRSP support on the MTS server, and those for providing notifications to the MCS client 110 (in accordance with the LRSP for a long-running service request or for a register for notification request). Of course it should be understood that the present invention contemplates that any number of other methods, appropriately associated with any number of other types of service handling protocols, can be used.

Figure 5:
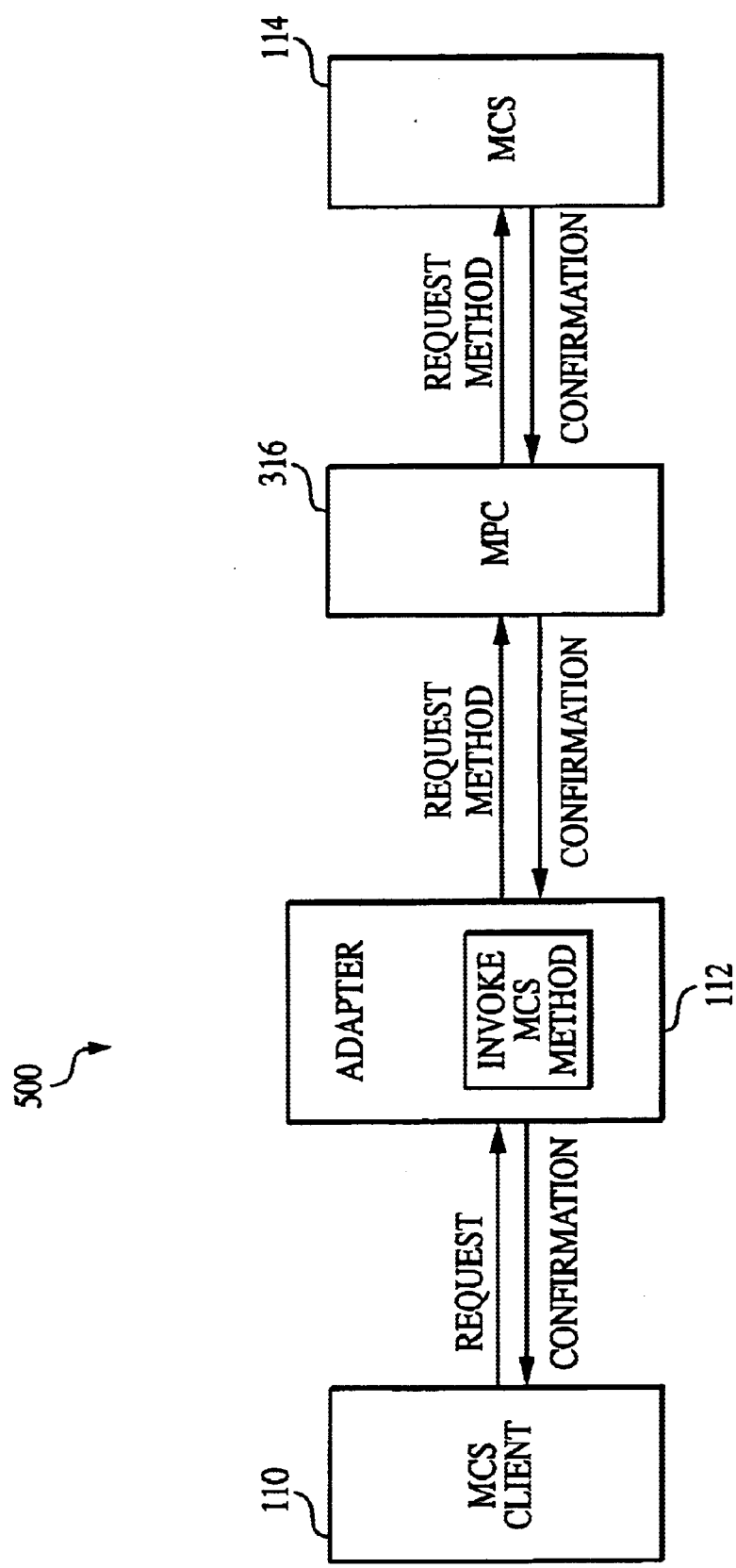
FIG. 5 is a block diagram of client request handling of synchronous requests through an interface adapter in accordance with embodiments of the present invention.

A synchronous request is one on which the MCS 114 can act immediately or which otherwise does not require any later response or confirmation from the MCS 114. Accordingly, the MCS client 110 will receive an immediate confirmation, if any, and need not wait for a later reply. Referring now to request processing diagram 550 in FIG. 5, in accordance with a synchronous protocol, the adapter 112 passes synchronous requests through to the MCS 114 directly (or through MCS protocol converter 316) by invoking an MCS method. When appropriate, the MCS 114 returned an immediate result to the adapter 112, which forwards the result to the MCS client 110.

Figure 6:
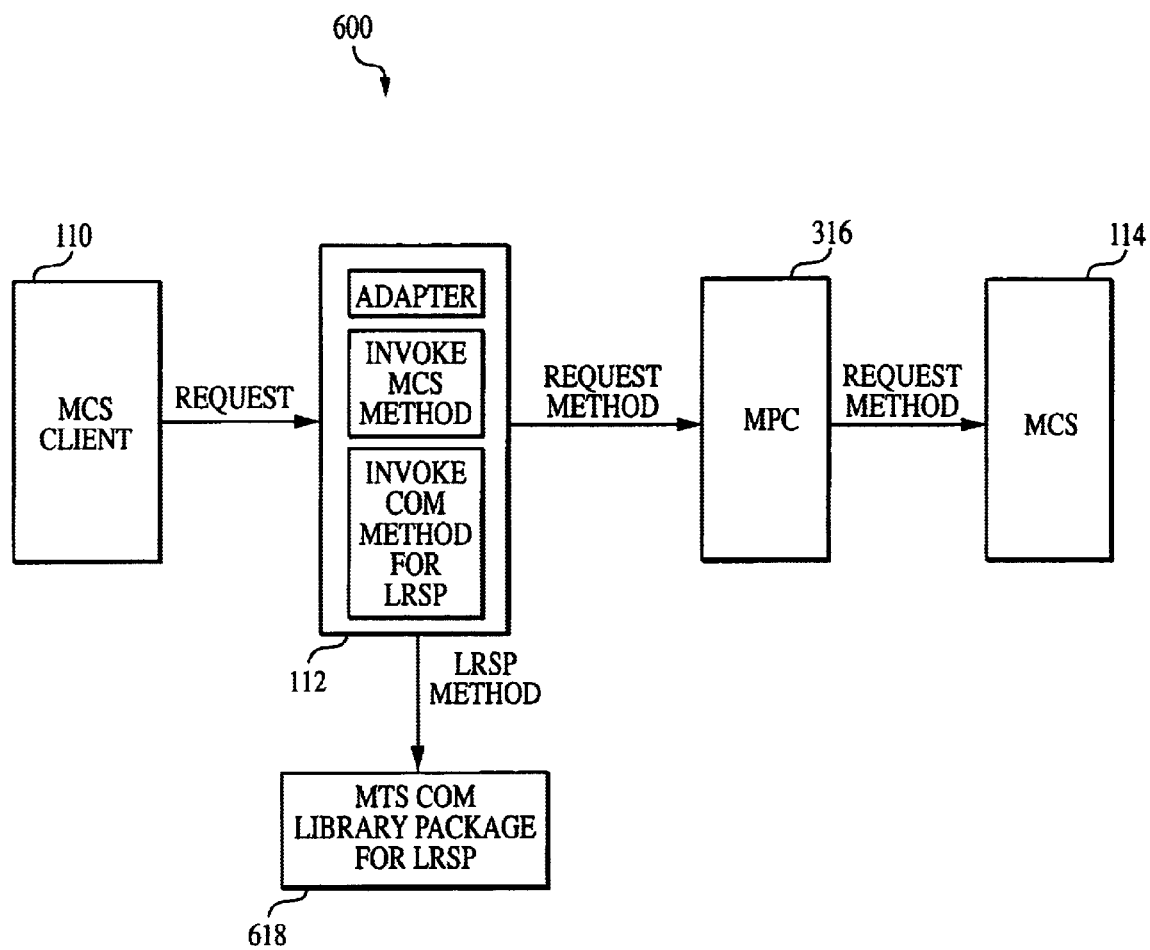
FIG. 6 is a block diagram of service handling for asynchronous or long-running service requests through an interface adapter in accordance with embodiments of the present invention.

An asynchronous request or LRSP request is one which the MCS 114 may take some time to act on or respond to (at least as measured from the perspective of a computer system operating as part of, or in environments of, the present invention or aspects thereof). For example, if the MCS is required to move a lot A from point B to point C, the MCS 114 will not be able to acknowledge completion of the request by providing notification to the MCS client 110 until it is actually performed. When MCS client 110 receives that response at a later time, the MCS client 110 needs to correlate the response to the initial request, for example with an LRSP identification number (LRSPID) or with the keys returned in the notification. In accordance with the LRSP, the interface adapter 112 manages the LRSP request for the MCS client 110. The interface adapter 112 includes an LRSP COM method in its COM method library 618 for handling these requests. Referring now to request processing diagram 600 in FIG. 6, when the interface adapter 112 receives an LRSP request for the MCS 114, it will pass the request on by invoking the MCS's related COM method and also invokes its own LRSP COM method to monitor the completion of the LRSP request. The LRSP COM method will match the LRSPID or the keys once it receives the reply from the MCS 114 to the initial request. (The reply process is diagrammed in FIG. 8.)

Figure 7:
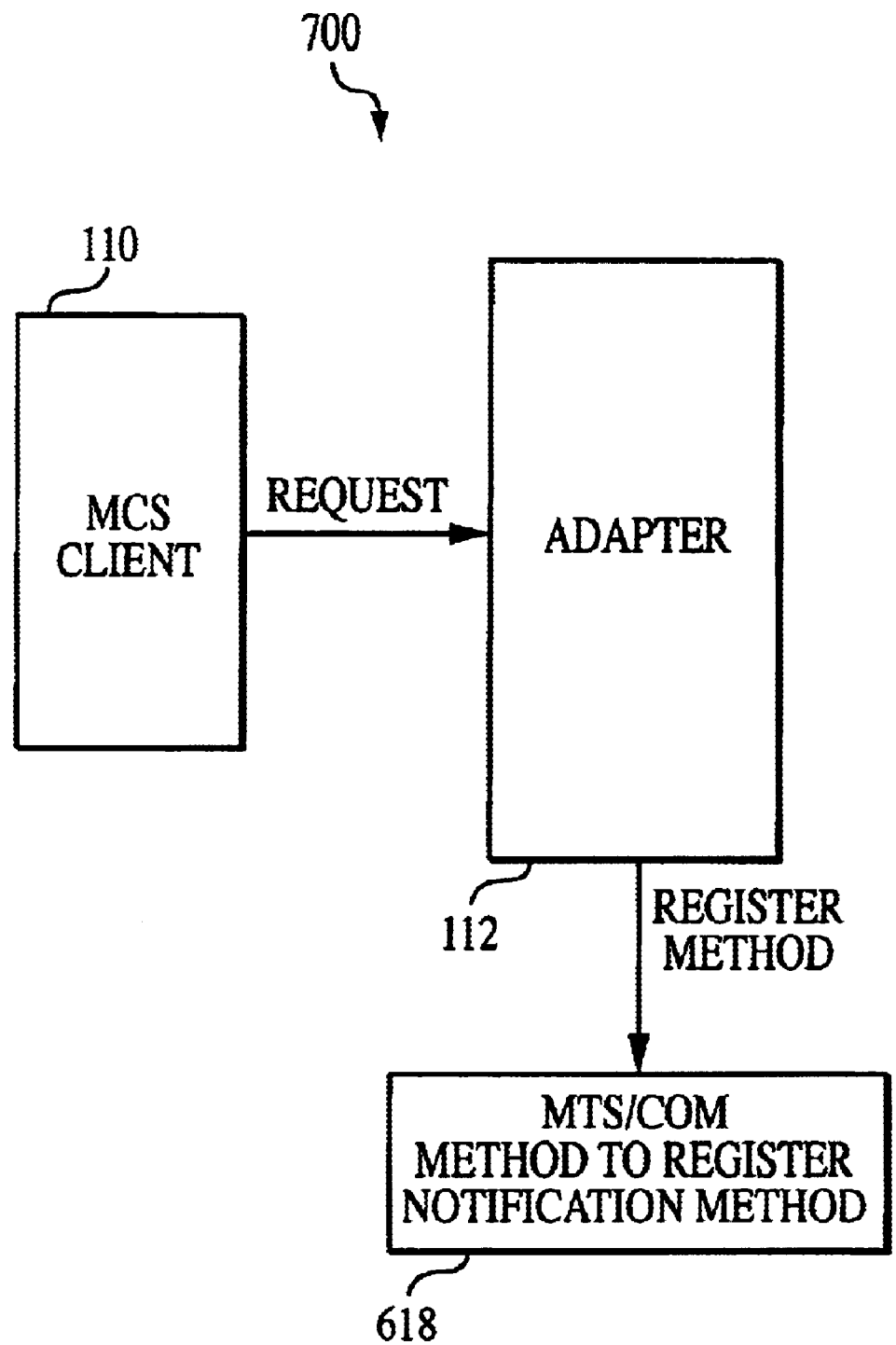
FIG. 7 is a block diagram of register for notification handling through an interface adapter in accordance with embodiments of the present invention.

A register for notification request is an outstanding request from the MCS client 110 to receive notification of events or alarms invoked by the MCS 114. Referring now to request processing diagram 700 in FIG. 7, the MCS client 110 registers its interest with the interface adapter 112 by providing a notification method and register key. In contemplated embodiments, a register for notification request is handled like a long-running service request in accordance with the LRSP. In accordance with the LRSP, the interface adapter 110 maintains the request by invoking its own LRSP COM method. No request is passed on to the MCS 114, but the MCS 114 is monitored by the adapter 112 for an event in which the client 110 has expressed interest and which should be reported back to the client 110 using the appropriate notification and publication methods.

Figure 8:
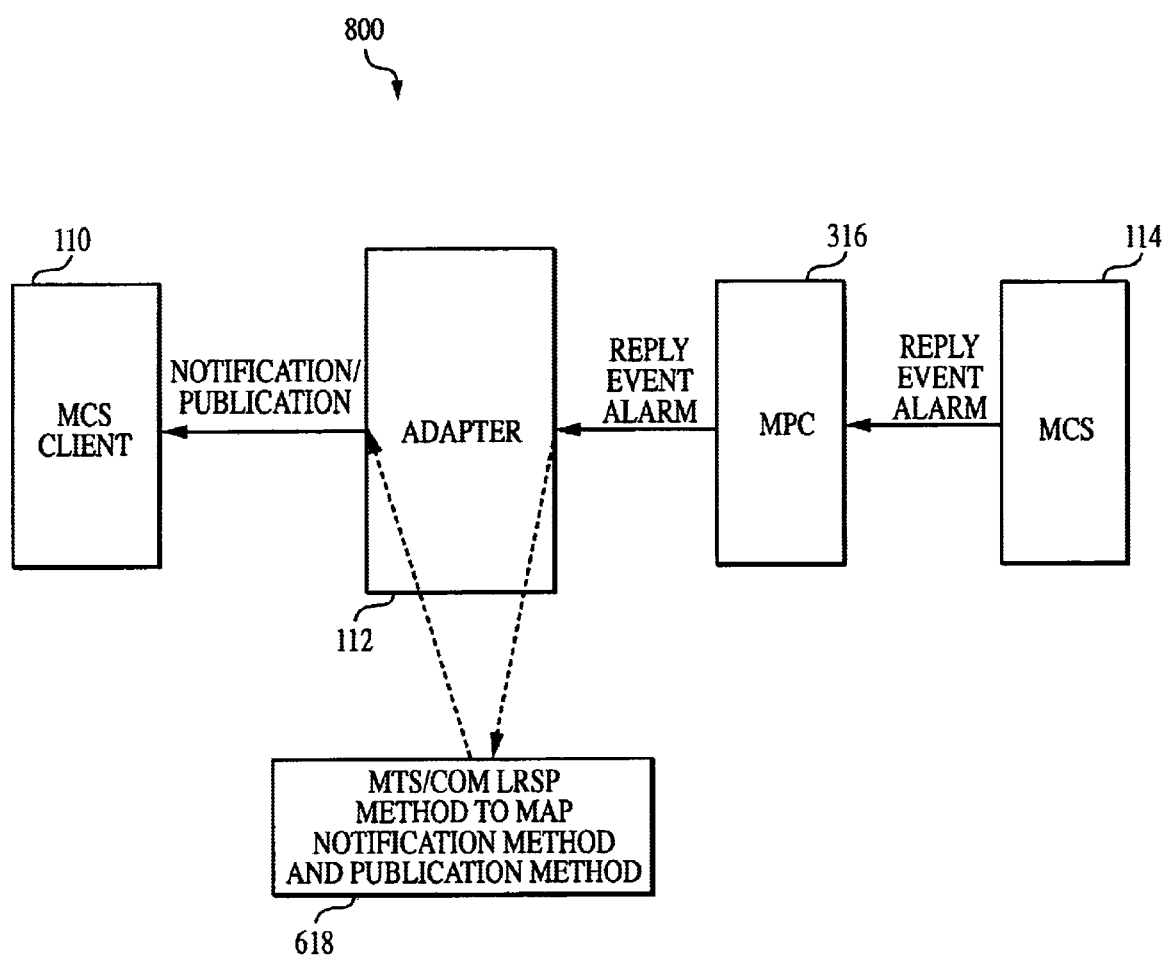
FIG. 8 is a block diagram of event notification handling through an interface adapter in accordance with embodiments of the present invention.

Referring now to message processing diagram 800 in FIG. 8, when the generic interface adapter 112 receives a reply, event or alarm from the MCS 114, the adapter 112 receives the information and correlates it with any LRSP requests, including asynchronous requests or register requests, using its LRSP COM method. The LRSP COM method may use an LRSPID or returned keys from the MCS 114 to correlate a notification from the MCS 114 with an outstanding request. The adapter 112 also determines which notification method has been selected by the MCS client 110 and provides the notification to the client 110. Embodiments of the invention contemplate that if a notification of an event or alarm is received from the MCS 114 for which there is no corresponding LRSP, including those for asynchronous requests and those for register for notification requests, the notification is ignored.

Figure 9:
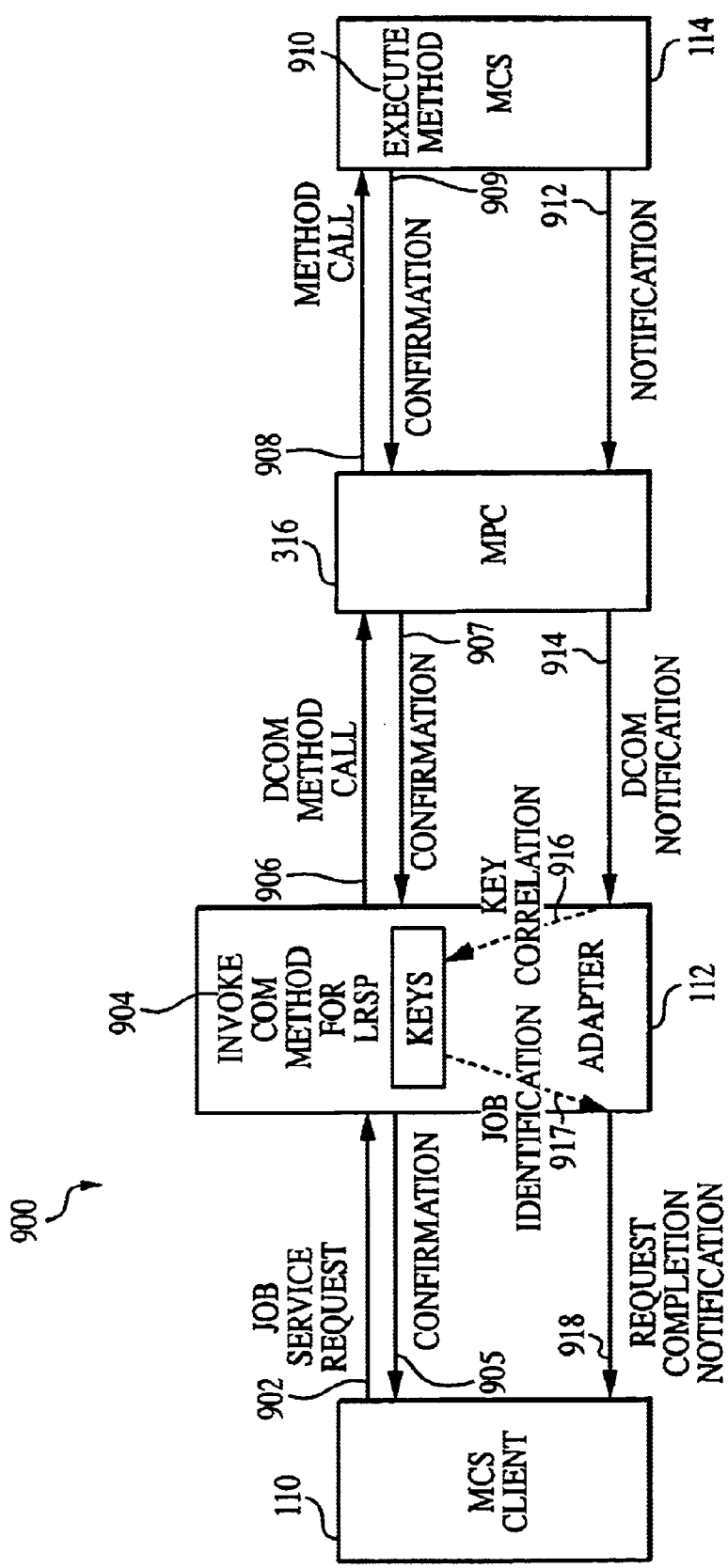
FIG. 9 is a block diagram of asynchronous or long running service request handling through an interface adapter in accordance with embodiments of the present invention.

A sample long-running service request handled in accordance with the LRSP is diagrammed in accordance with an embodiment of the invention in request processing diagram 900 in FIG. 9. In step 902, the MCS client 110 requests service for a job such as a batch transport job. The client 110 provides values for the corresponding parameters, such as source and destination information, for the request. The adapter 112 receives the request and, in step 904, invokes its COM method for LRSP support and stores the keys, such as destination information. In step 905, adapter 112 confirms receipt of the request. In step 906, the adapter 112 calls the appropriate DCOM method, which optionally is relayed through MPC 316 in step 908. In steps 907 and 909, the MPC 316 and the MCS 114 confirm receipt of the request. In step 910, the MCS 114 executes the method to service the request. In step 912, the MCS 114 issues a notification including the keys, when the method is completed. The MPC 316 passes the notification on to adapter 112. In steps 916 and 917, adapter 112 uses the keys to identify the original job that has been completed and provides a job identification. Subsequently, in step 918, the adapter 112 passes on the notification that the long-running service is complete, with the job identification. The client MCS 110 can move on to the next step in a business process that follows completion of the MCS service.

Although the generic interface builder 230 and the generic interface adapter 112 have been described herein by reference to an MCS tool 114, an adapter 112 may be generated for any other type of tool. The tool may be software or hardware or may be a large system incorporating both hardware and software, typically with a software interface, such as the MCS protocol converter 316. Preferably, the tool will be a COM-based tool and will have its interface defined in Interface Definition Language.

Figure 10:
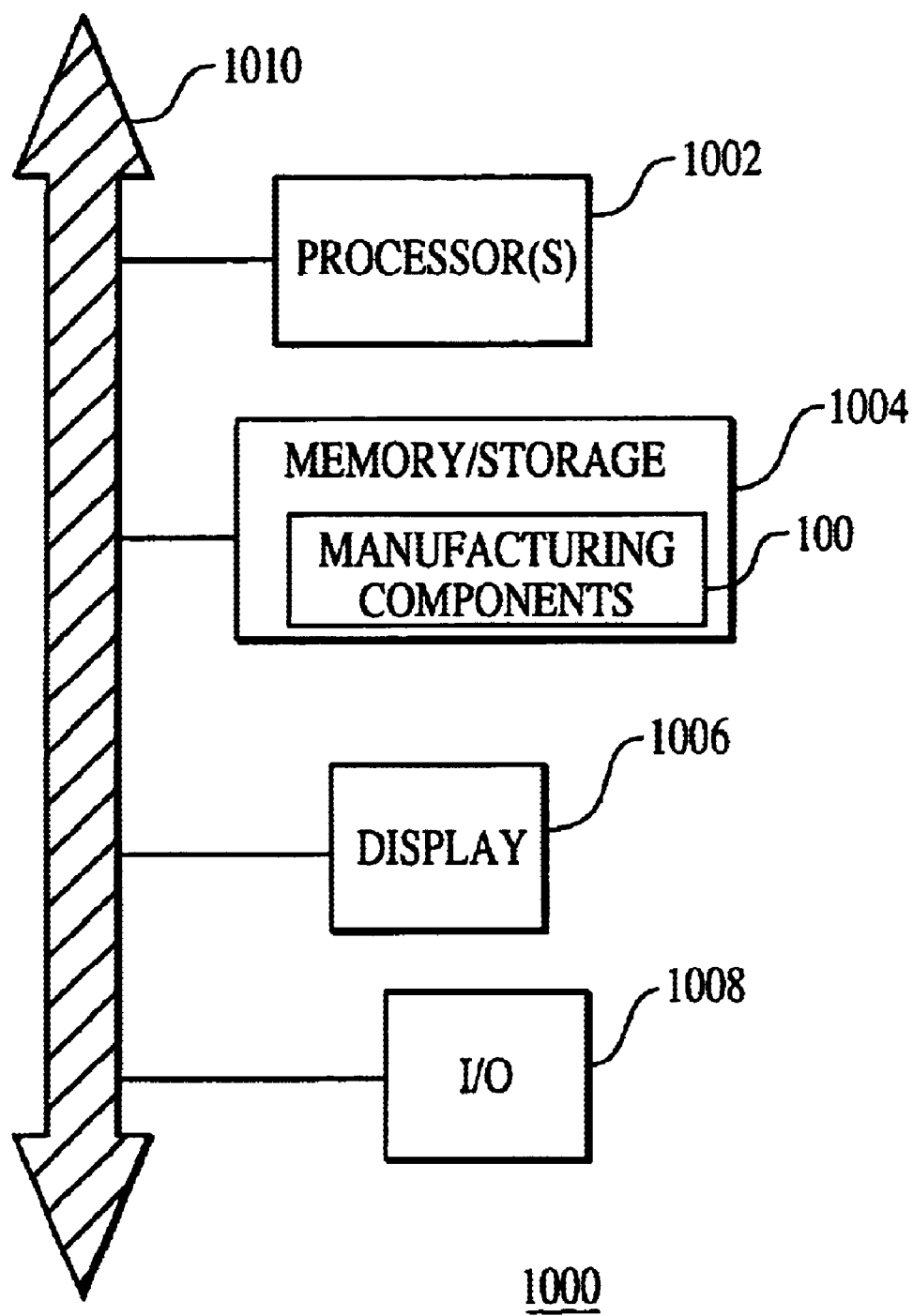
FIG. 10 is a block diagram of a computer processing system used as part and/or in environments of the present invention.

Exemplary components of a computer processing system used as part of the present invention, and/or used in environments or in conjunction therewith are shown with regard to FIG. 10. Referring now to FIG. 10, manufacturing components 100 (having at least some of the various aspects, functionality and components described above) are shown to reside in a memory/storage device 1004. It is also envisioned that these aspects can originate from communications I/O 1008 (discussed below).

Embodiments of the present invention contemplate that the memory/storage device 1004, itself, could be any number of different types of computer-readable mediums for storing information, including RAM memory, magnetic, electronic, or optical (including holographic) storage, some combination thereof, etc. It should also be understood that, particularly where a tool in communication with adapter 112 (as mentioned above) is an item of hardware (in contrast to, e.g., a software system), then that tool could communicate with the manufacturing components via, e.g., I/O 1008.

Memory/storage 1004 is shown as being in-communication, via communication link 1010 (e.g., a bus), with one or more processor(s) 1002. Embodiments of the present invention contemplate that the processor(s) 1002 can be those typically found in the types of computers mentioned below, and/or they can be any number of other types of processor(s).

Still referring FIG. 10, a display device 1006 is shown. Also shown is I/O 1008, which is envisioned to communicate with, e.g., tools and/or with various communications networks such as local area networks, the Internet, etc. Here, I/O 1008 is shown to be in communication with processor(s) 1002 and memory/storage 1004 via communication link 1010.

The present invention further contemplates that I/O 1008 can serve to receive various transmission schemes such as those relating to telecommunications, cable or other transmission mechanisms, and that at least some of the aspects of manufacturing components 100 can, in whole or part, be a transmission. Thus, for example, at least some aspects of virtual manufacturing components 100 that might otherwise originate from memory/storage 1004 could instead originate from I/O 1008 (e.g., the medium from which aspects of the manufacturing components 100 originate can be a transmission).

It should be understood that the configuration of the various aspects of the present invention depicted by FIG. 10 is by way of example, and that the present invention contemplates any number of different configurations and/or different components.

With regard to the various specific processors 1002 contemplated for use with the present invention as depicted by FIG. 10, one exemplary embodiment includes the use of any of the Pentium line of processors from Intel Corporation of Santa Clara, Calif., and/or a Motorola 68000 series processor such as the 68040 processor from Motorola of Schaumberg, Ill. Exemplary operating systems include Microsoft NT from Microsoft Corporation, as well as any of the various varieties of Unix or Linux. Of course, it should be understood that any number of different types and combinations of current or future processors and/or operating systems could also be used.

The language used herein is used for purposes of reference and not limitation. While the invention has been particularly shown and described with reference to preferred embodiments, it will be apparent to those skilled in the art that various modifications and alterations can be made in the described embodiments of the present invention without departing from the spirit and scope of the invention.

We claim:

1. A computer-based method for generating a generic interface adapter to facilitate communication between a manufacturing execution system and a tool in a manufacturing facility, comprising the steps of:
   (1) reading a method type library from the tool, wherein said method-type library contains one or more methods relating to the tool;
   (2) selecting a protocol to be associated with at least one of said one or more methods, wherein at least one protocol is a long-running service protocol for supporting long-running service protocol requests;
   (3) generating an interface adapter for managing communication between the manufacturing execution system and the tool, including the managing of long-running service protocol requests; and
   (4) associating one or more identifiers with said at least one method, said at least one method being associated with a long-running service protocol, wherein said one or more identifiers are for use by the interface adapter in managing communication between the manufacturing execution system and the tool.

2. The method of claim 1, wherein said step of associating one or more identifiers includes defining a transaction identification number for said at least one method.

3. The method of claim 1, wherein said at least one method is associated with one or more parameters, said step of associating one or more identifiers including selecting at least one of said one or more parameters as a key for said at least one method.

4. The method of claim 1, wherein said step of generating an interface adapter includes the step of defining an adapter method by modifying at least one of said one or more methods to wrap the method with information relating to the selected protocol and the associated one or more identifiers.

5. The method of claim 1, further including the step of providing a graphical user interface to allow a user to perform said step of selecting a protocol.

6. The method of claim 5, wherein said graphical user interface is provided through a graphical interface of the manufacturing execution system.

7. The method of claim 1, further including the step of providing a protocol converter for the tool, wherein said protocol converter facilitates said step of reading a method type library by translating said method type library into a desired format.

8. The method of claim 1, wherein the generated interface adapter has one or more interface methods for communicating with the manufacturing execution system and the tool, further including the step of registering at least one of said one or more interface methods for use by the manufacturing execution system.

9. The method of claim 1, wherein said step of generating an interface adapter includes generating a long-running service protocol support function.

10. The method of claim 1, wherein at least one protocol is a synchronous protocol.

11. The method of claim 1, wherein the method type library is a Distributed Common Object Model type library.

12. The method of claim 1, wherein the tool is an event-based tool.

13. The method of claim 1, wherein the tool is a material control system.

14. A generic interface adapter builder program on a computer-readable medium for generating a generic interface adapter to facilitate communication between a manufacturing execution system and a tool in a manufacturing facility, the program comprising:
 a module for reading a method type library from the tool, wherein said method type library contains one or more methods relating to the tool;
 a module for selection of a protocol to be associated with at least one of said one or more methods, wherein at least one protocol is a long-running service protocol for supporting long-running service protocol requests; and
 a module for generating code for an interface adapter for managing communication between the manufacturing execution system and the tool, including the managing of long-running service protocol requests,
 wherein said module for selection of a protocol further allows for association of one or more identifiers with at least one of said one or more methods, wherein said one or more identifiers is for use by the interface adapter in managing communication between the manufacturing execution system and the tool.

15. The program of claim 14, wherein said module for generating code includes one or more routines for generating a method type library for the interface adapter.

16. A method according to claim 14, wherein said association of one or more identifiers includes a definition of a transaction identification number for at least one of said one or more methods.

17. A method according to claim 14, wherein at least one of said one or more methods is associated with one or more parameters, wherein said association of one or more identifiers includes a selection of at least one of said one or more parameters as a key for at least one of said one or more methods.

18. The program of claim 14, further including a graphical user interface, wherein the graphical user interface allows a user to access said module for selection of a protocol.

19. The program of claim 14, wherein said module for generating code includes one or more routines for modifying at least one of said one or more methods to wrap the method with information relating to the selected protocol and associated one or more identifiers.

20. The program of claim 14, further including a protocol converter for the tool, wherein said protocol converter enables said module for reading a method type library by translating said method type library into a desired format.

21. The program of claim 14, wherein the module for generating code includes information relating to one or more communication methods of the manufacturing execution system.

22. The program of claim 14, wherein the program is a Distributed Common Object Model component.

23. A manufacturing execution system for running a manufacturing facility, the manufacturing facility including one or more tools, comprising:
 a client component of the manufacturing execution system for managing the use of at least one of said one or more tools, the client component having communication with the tool, the communication including requesting services from the tool and receiving notifications regarding the tool, the communication including long-running service requests from the client component;
 a generic interface adapter builder for generating an adapter interface for managing communication between the client component and the tool, the generic interface adapter builder incorporating support for long-running service protocol requests into said interface adapter; and
 a module, in data communication with the generic interface adapter builder, for associating one or more identifiers with at least one method of at least one of said long-running service protocol requests, wherein said one or more identifiers are for use by said interface adapter in managing communication between the client component of the manufacturing execution system and the at least one of said one or more tools.

24. The system of claim 23, further comprising a graphical user interface for managing the manufacturing execution system, the graphical user interface providing access to the generic interface adapter builder.

25. The system of claim 23, the communication further including synchronous requests from the client component, the interface adapter supporting synchronous requests.

26. The system of claim 23, the communication further including register for notification requests from the client component, the interface adapter supporting register for notification requests.

27. The system of claim 23, wherein the generic interface adapter builder is a Distributed Common Object Model component.

28. A computer-based method for generating an interface adapter to facilitate communication between a manufacturing execution system and a tool in a manufacturing facility, comprising the steps of:

reading a method type library from the tool, wherein said method-type library contains one or more methods relating to the tool;

selecting a protocol to be associated with at least one method of said one or more methods, wherein at lest one protocol is a long-running service protocol for supporting long-running service protocol requests; and associating one or more identifiers with said at least one method, said at least one method being associated with a long-running service protocol, wherein said one or more identifiers are for use by an interface adapter in managing communication between the manufacturing execution system and the tool.

29. The method of claim 28, wherein said step of associating one or more identifiers includes defining a transaction identification number for said at least one method.

30. The method of claim 28, wherein said at least one method is associated with one or more parameters, said step of associating one or more identifiers including selecting at lest one of said one or more parameters as a key for said at least one method.

31. A generic interface adapter builder program on a computer-readable medium for generating a generic adapter to facilitate communication between a manufacturing execution system and a tool in a manufacturing facility, the program comprising:

a module for reading a method type library from the tool, wherein said method type library contains one or more methods relating to the tool; and a module for selection of a protocol to be associated with at least one of said one or more method, wherein at least one protocol is a long-running service protocol for supporting long-running service protocol requests, wherein said module for selection of a protocol further allows for association of one or more identifiers with at least one method of said one or more methods, and wherein said at least one method is associated with a long-running service protocol, wherein said one or more identifiers is for use by an interface adapter in managing communication between the manufacturing execution system and the tool.

32. The program according to claim 31, wherein said association of one or more identifiers includes a definition of a transaction identification number for said at least one method.

33. The program according to claim 31, wherein said at least one method is associated with one or more parameters, wherein said association of one or more identifiers includes a selection of at least one of said one or more parameters as a key for said at least one method.

* * * * *